(12) United States Patent
Lundquist

(10) Patent No.: US 11,789,152 B2
(45) Date of Patent: Oct. 17, 2023

(54) HIGH RANGE RESOLUTION LIGHT DETECTION AND RANGING

(71) Applicant: Arete Associates, Northridge, CA (US)

(72) Inventor: Paul Bryan Lundquist, Longmont, CO (US)

(73) Assignee: Arete Associates, Northridge (CA)

( * ) Notice: Subject to any disclaimer, the term of this patent is extended or adjusted under 35 U.S.C. 154(b) by 1346 days.

(21) Appl. No.: 16/188,828

(22) Filed: Nov. 13, 2018

(65) Prior Publication Data
US 2020/0025930 A1 Jan. 23, 2020

Related U.S. Application Data

(60) Provisional application No. 62/589,251, filed on Nov. 21, 2017.

(51) Int. Cl.
*G01S 17/89* (2020.01)
*G06T 11/00* (2006.01)
*G01S 17/42* (2006.01)

(52) U.S. Cl.
CPC .............. *G01S 17/89* (2013.01); *G01S 17/42* (2013.01); *G06T 11/003* (2013.01)

(58) Field of Classification Search
None
See application file for complete search history.

(56) References Cited

U.S. PATENT DOCUMENTS

| 2004/0031906 A1* | 2/2004 | Decker ................... G01J 11/00 250/208.1 |
| 2005/0157292 A1* | 7/2005 | Saitoh ................ G01N 21/6408 356/417 |
| 2007/0024840 A1* | 2/2007 | Fetzer ................... G01S 7/4811 382/106 |
| 2010/0074279 A1* | 3/2010 | Fermann ................ H01S 3/067 372/18 |
| 2014/0333467 A1* | 11/2014 | Inomata ............... G01S 13/931 342/104 |
| 2018/0018757 A1* | 1/2018 | Suzuki .................. G06T 3/4053 |
| 2018/0188077 A1* | 7/2018 | Ronnekleiv ........... G01D 5/268 |

* cited by examiner

*Primary Examiner* — Tapas Mazumder
(74) *Attorney, Agent, or Firm* — FisherBroyles, LLP; Gregory T. Fettig

(57) ABSTRACT

Lidar systems and methods are presented herein. In one embodiment, a lidar system includes a laser operable to propagate ultrashort laser pulses to a target during a plurality of scanning periods. The lidar system also includes a streak tube imaging system operable to collect returns of the ultrashort laser pulses from the target during each scanning period, and to generate a two-dimensional image of the returns during each scanning period. The lidar system also includes a processor operable to generate a representation of the target based on the 2D images from the streak tube imaging system.

23 Claims, 19 Drawing Sheets

HIGH RANGE RESOLUTION LIGHT DETECTION AND RANGING

CROSS REFERENCE TO RELATED APPLICATIONS

This patent application claims priority to, and thus the benefit of an earlier filing date from, U.S. Provisional Patent Application No. 62/589,251 (filed Nov. 21, 2017), the entire contents of which are hereby incorporated by reference.

BACKGROUND

Light Detection and Ranging, or "lidar" (also referred to as Laser Detection and Ranging, or "LADAR") typically involves propagating pulses of laser light to an object and measuring the time it takes for the pulses to scatter and return from the object. For example, since light moves at a constant and known speed (~$3 \times 10^8$ meters per second in air), a lidar system can calculate the distance between itself and the object based on the amount of time it takes for each pulse to bounce back from the object.

SUMMARY

Lidar systems and methods are presented herein. In one embodiment, a lidar system includes a laser operable to propagate ultrashort laser pulses to a target during a plurality of scanning periods. An ultrashort laser pulse is a laser pulse that is generally on the order of a femtosecond to ten picoseconds in duration. The lidar system also includes a streak tube imaging system operable to collect returns of the ultrashort laser pulses from the target during each scanning period, and to generate a two-dimensional (2D) image of the returns during each scanning period. A processor then generates a representation of the target based on the 2D images from the streak tube imaging system.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software, firmware, hardware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments and are included within the scope thereof. Furthermore, any examples described herein are intended to aid in understanding the principles of the embodiments and are to be construed as being without limitation to such specifically recited examples and conditions.

Figure 1:
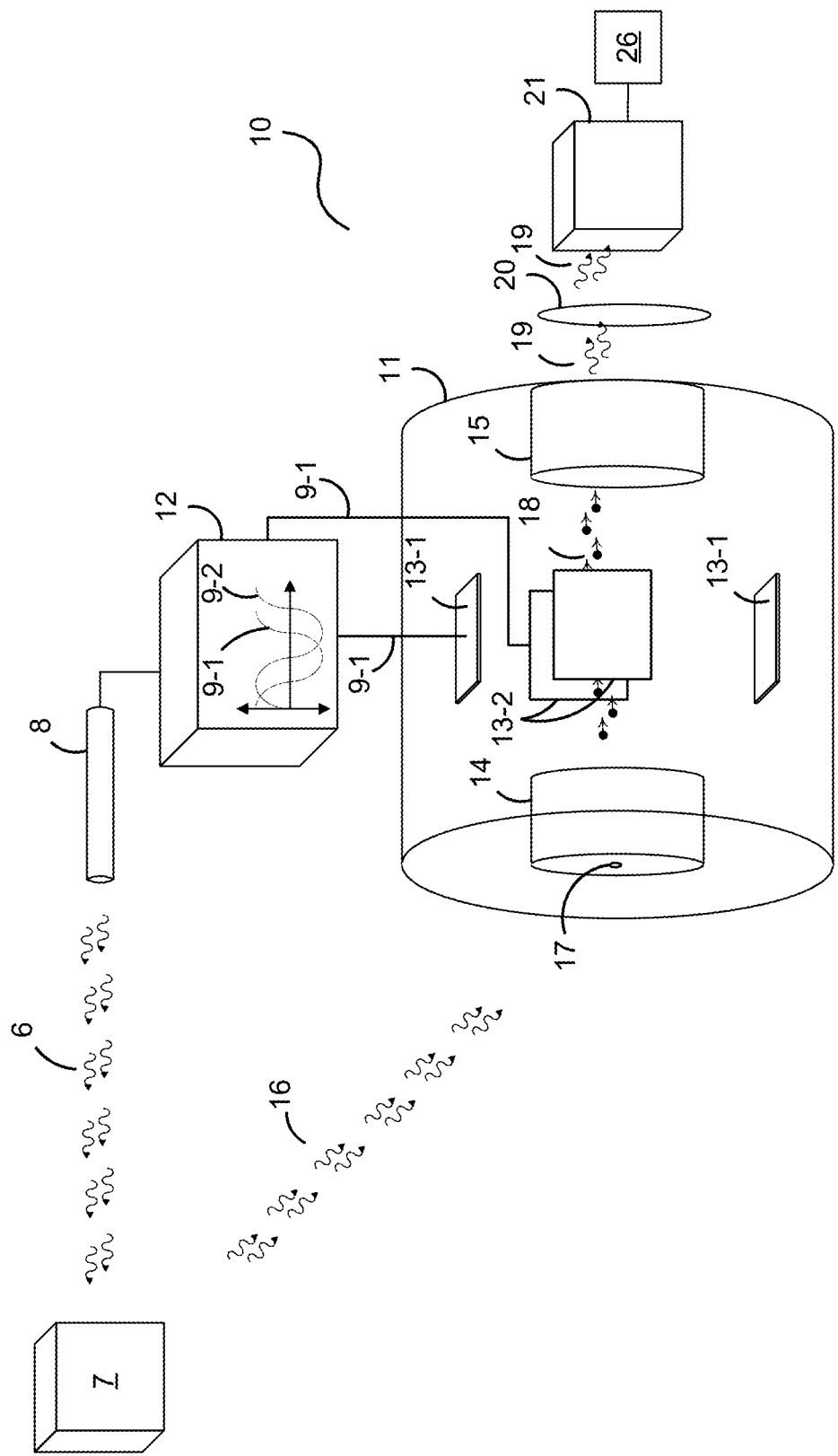
FIG. 1 is a block diagram of an exemplary lidar system.

FIG. 1 is a block diagram of an exemplary lidar system 10. The lidar system 10 employs a laser 8 that may be a mode-locked laser to produce relatively short optical pulses (e.g., laser pulses that are less than 1 ns in duration) at a high repetition rate (e.g., a pulse repetition frequency, or PRF, of at least 1 MHz). The laser 8 delivers a stream of laser pulses 6 to a target 7, which may be at a distance that is much longer than the separation distance between the delivered optical pulses 6.

The lidar system 10 also includes a streak tube 11 to provide relatively high range resolution. Streak tubes may be used to map space-time distributions of received optical signals (e.g., photons). The optical signal may be received through an aperture 17 and mapped to a 2D image. Typically, streak tubes are operated so that a horizontal axis of the image corresponds to a spatial position of the signal along a slit aperture, and a vertical axis of the image corresponds to the time delay of the signal. The image intensity corresponds to input optical intensity of the signal. However, in this embodiment, the streak tube 11 may be configured with an aperture 17 that is somewhat symmetric in both vertical and horizontal directions (e.g., circular). This may provide the lidar system 10 with improved resolution of the target 7 at greater distances.

In this embodiment, the streak tube 11 receives optical signals 16 (e.g., laser pulse returns) with a photo-cathode 14. The aperture 17 couples the optical signals 16 to the photo-cathode 14. For example, the aperture 17 may image laser pulse returns 16 from the target 7 onto the photo-cathode 14. And, light patterns appearing at the aperture 17 illuminate the photo-cathode 14 and cause the photo-cathode 14 to release electrons 18 in a pattern that matches the light pattern.

Generally, in the streak tube 11, a scan in two dimensions is preferable so as to distinguish individual returns 16 from one another. Thus, the lidar system 10, in this embodiment, comprises two electrode pairs 13-1 and 13-2 that may circularly displace (or displace in some other continuous pattern, such as a Lissajous pattern) the electrons 18 as they pass through the streak tube 11 depending on the voltage waveforms 9-1 and 9-2. Although, in some embodiments, a single electrode pair 13 may be used to displace the electrons 18.

The voltage waveforms 9-1 and 9-2 placed on electrode pairs 13-1 and 13-2 provide transverse displacements to the electrons 18 and direct the electrons 18 towards transverse coordinates on the phosphor screen 15, where the electron's kinetic energy is converted into photons 19 in a spatial pattern matching the light temporal patterns at the aperture 17. A sweep voltage circuit 12 produces a dynamic electric field across the electrode pairs 13-1 and 13-2 using time varying voltages 9-1 and 9-2. In some embodiments, magnetic field-based electron deflection may be used.

Generally, the voltage difference across the electrode pairs 13-1 and 13-2 may result in an electric field which places forces on electrons 18 propagating nearly perpendicular to the field. The two electrode pairs 13-1 and 13-2 may be used to control displacement of the propagating electrons 18 in both the vertical and horizontal directions of the phosphor screen 15. For example, each electrode pair 13-1 and 13-2 may be coupled to a dedicated time varying voltage waveform source (e.g., voltage waveforms 9-1 and 9-2) to sweep electrons 18 resulting from the returns of the ultrashort laser pulses 16 in a continuous pattern. The voltage waveforms 9-1 and 9-2 provided to the streak tube 11 by the sweep voltage circuit 12 via the electrode pairs 13-1 and 13-2 provide a time-dependent location on the phosphor screen 15 (or other electron receiving component) where the electrons 18 are incident. In this regard, the voltage waveforms 9-1 and 9-2 may scan the electron beam across the phosphor screen 15 in a manner illustrated in FIG. 2.

This electric field deflects the path of the electrons 18 traversing the streak tube 11 such that a phosphor image is formed at the phosphor screen 15 where electrons 18 impact the screen 15. For example, a laser pulse return 16 received by the streak tube 11 at one moment will be displaced in the phosphor image with respect to an earlier moment forming an illuminated shape in the phosphor image on the arc 33 (e.g., illuminations 34 with only a few shown for the sake of brevity). The time delay of the laser pulse returns 16 illuminating the photo-cathode 14 is generally proportional to the distance within the backscattering medium (e.g., the target 7) and results in a displacement offset in the phosphor image formed by the phosphor screen 15.

A resultant 2D spatial emission pattern at the phosphor screen 15 is digitized using an imaging optical element 20 and a detector 21, such as a lens configured with a focal plane array (FPA), an optical detector array lens, or other imaging device. The image, therefore, has a temporal-sensing direction or path corresponding to a time delay and may have an additional spatial-sensing path from the aperture 17 corresponding to an intensity on the phosphor screen 15. The imaging optical element 20, if configured as a lens, provides a means for mapping the phosphor image to the imaging detector 21. However, other techniques may be used, such as tapered fiber arrays, direct electron receiving detector arrays for electrical signal readout, imaging lenses, and/or focusing elements To illustrate, the lidar system 10 may emit a beam of laser pulses 6 to illuminate the target 7. The streak tube 11 may be aligned so that the laser pulse returns 16 may be imaged onto the aperture 17. The light pattern of the returns 16 from the phosphor screen 15 is imaged onto an FPA (e.g., the detector 21) for analysis. The aperture 17 may substantially limit the laser pulse returns 16 to a point on the photo-cathode 14. The processor 26 can determine and form a structural representation of the target 7 (e.g., a 2D image, a three-dimensional "3D" image, or some other identifying signature of the target 7) from the intensities of the returns 16.

The detector 21 may also generate synchronization triggers that are produced with dynamically controlled temporal displacements relative to the optical pulses 6 from the laser 8. In this regard, the processor 26 may synchronize the propagation of at least a portion of the ultrashort laser pulses 6 from the laser 8 with a corresponding portion of the returns of the ultrashort laser pulses 16 at the streak tube 11. The sweep voltage circuit 12 may also produce voltage waveforms for streak tube deflection that are synchronized to laser triggers provided by the laser 8. In one embodiment, the two waveforms 9-1 and 9-1 are generated with sinusoidal shapes and with a 90-degree phase delay between the two. This results in a circular scan pattern of the propagated electrons 18 at the phosphor screen 15.

However, other waveforms 9-1 and 9-1 may be used to scan the electrons 18 in other patterns, such as Lissajous patterns. For example, one waveform 9 may be periodic with a frequency that is an integer multiple of the laser pulse frequency, so that, in general, the electron sweep pattern may be a closed Lissajous pattern that repeats at the laser repetition frequency (or a harmonic thereof). The relative phase delays between the laser triggers and the phases of each waveform are a matter of design choice and may be selected to distribute the time-dispersed signal in a preferred pattern upon the phosphor screen 15.

Figure 2:
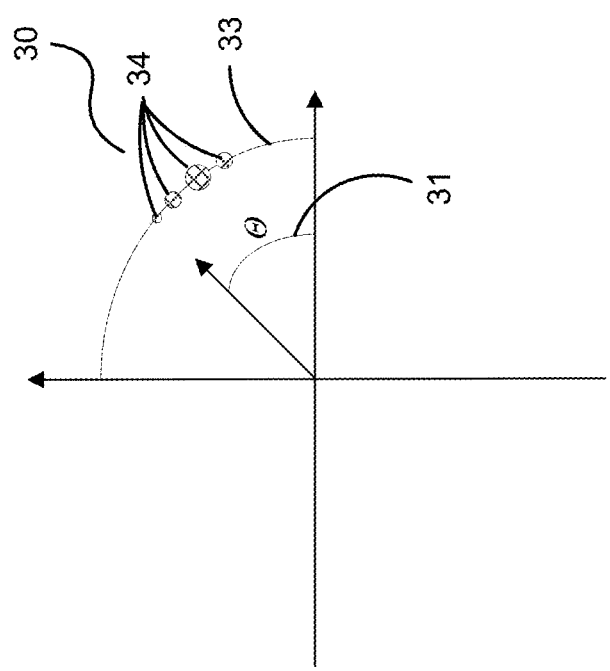
FIG. 2 illustrates an exemplary curved detection sweep path of a laser pulse return on a 2D image plane.

To illustrate, FIG. 2 shows the plane 30 of the phosphor screen 15 where the streak tube 11 scans a circular scan pattern, as illustrated by arc 33. Electrons hitting the phosphor screen 15 and causing illumination are associated with received lidar photons having a delay time that is proportional to the angle θ (31) of the circular scan pattern. By analyzing signal strengths of image pixels that are in the path of the circular scan pattern and associating them with the angle θ, a range image can be extracted.

Figure 3:
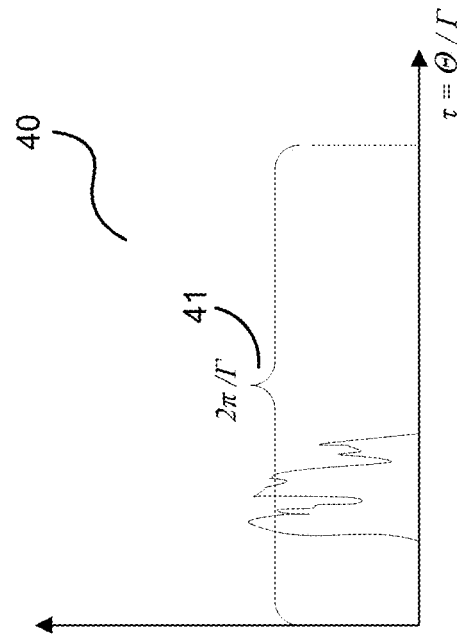
FIG. 3 illustrates the range image extracted from the exemplary curved detection sweep path of FIG. 2.

FIG. 3 illustrates the range image 40 extracted from the exemplary curved detection sweep path of FIG. 2. The range image time is τ=θ/Γ, where Γ is the frequency of the streak tube circular scan. Because the scan is circular, the captured range image 40 is cyclic with a time period equal to 2π/Γ (41). On each subsequent laser pulse return 16, the pattern that is formed on the phosphor screen 15 is accumulated, so that generally the digitized image of the phosphor screen 15 may represent signals accumulated from many laser pulse returns 16.

In an alternative embodiment, the lidar system 10 may emit a fanned beam of laser pulses 6 directly at the target 7 for a 3D representation of the target 7. However, in such an embodiment, the target may need to be relatively close. For example, for targets that are relatively far away, spatial determinations of the target may not be resolvable. So, a slit aperture may allow too much background light in the streak tube 11. More generally, the aperture 17 may be dynamically configurable to permit either mode of operation.

In one embodiment, the processor 26 may also provide calibration of the streak tube system 10 by introducing fiducial signals. The fiducial signals have known qualities or attributes that are operable to provide a geometric calibration mapping of specific pixels to time and image angle. For example, variations in environmental conditions (e.g., changes in the orientation of the earth's magnetic field relative to the streak tube 11, opto-mechanical distortion of the streak tube 11, thermal distortion of the streak tube 11, etc.) may be encountered during operation of the streak tube 11.

This "environmental degradation" can distort the geometric calibration mapping of the electrons 18 to the phosphor screen 15 of the streak tube 11. The embodiments herein can also provide a dynamic calibration that can directly/regularly measure and update geometric maps to account for the environmental degradation during operations of the streak tube 11. The processor 26 may be operable to correct the environmental degradation of the streak tube 11 by adjusting the image generated by imaging optical element 21 and/or any other imaging components using the fiducial signals.

Figure 4:
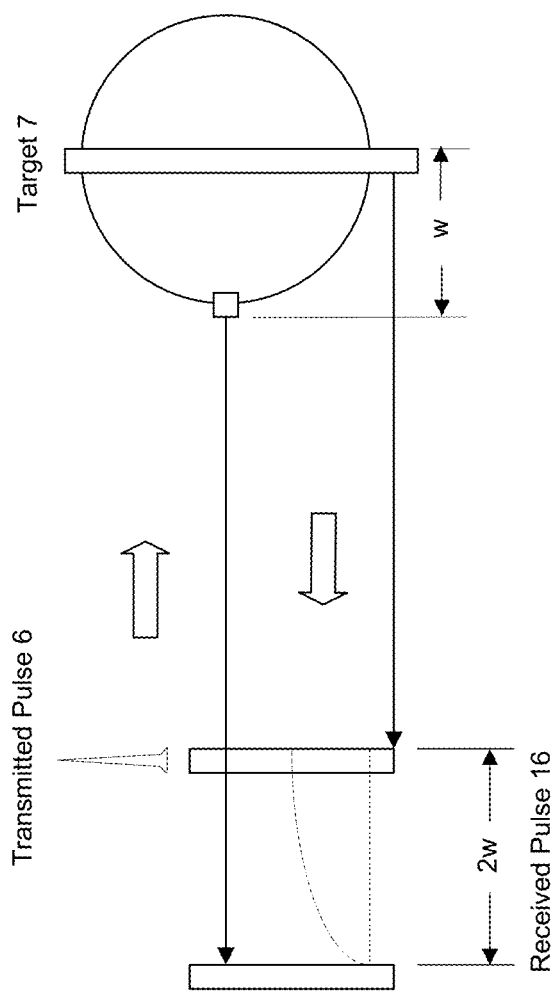
FIGS. 4 and 5 illustrate an exemplary lidar illumination of a spherical object.
Figure 5:
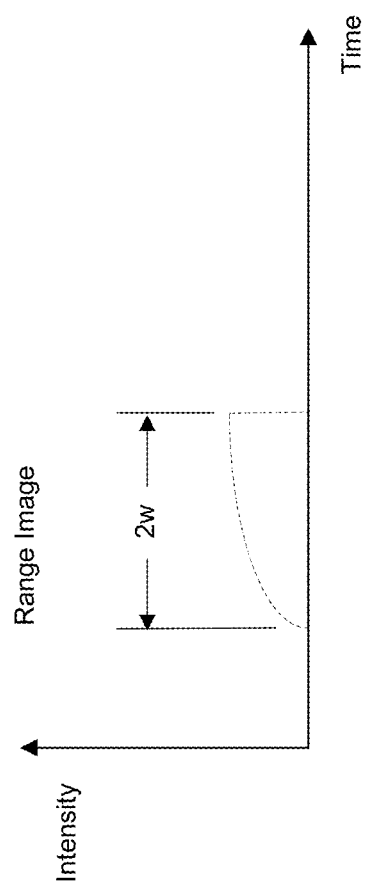

FIGS. 4 and 5 illustrates an exemplary lidar illumination of a spherical object (e.g., the target 7) via the optical pulses 6. The resulting lidar range image provides information on the general shape of the object.

FIG. 4 shows an example of a received range image extracted from a laser pulse that has been reflected from the target 7. When interacting with a target 7 that is extended in range, light that is scattered from the near portions of the target 7 is received at an earlier time than light that is scattered from far portions of the target 7. The result is a temporal optical signal that is longer in duration than the transmitted pulse 6 and has a signal temporal shape that captures range dependent information of the target 7. In the case where the transmitted laser pulse 6 from the laser 8 has a range extent that is shorter than the target 7, the received signal from light scattered from the target 7 is often referred to as a range image, as illustrated in FIG. 5. The range image may be expressed as a function of time or, by multiplying the time axis by the speed of light and dividing by two, the range image may be expressed as a function of range.

The lidar system 10 acts to spatially map the range image to the detector 21. In one embodiment, the detector 21 comprises a plurality of pixel detectors configured in an array that are associated with range image time delays. In some embodiments, the detection mechanism may be selected to have a bandwidth that is much less than the laser repetition rate. For example, phosphor emission times may be as long as many 10's of ms. Consequently, the range image may be accumulated over many laser pulses. However, since the sweep pattern is periodic and synchronized to the laser pulse rate, the accumulated signal at a pixel may be associated with the same range relative to the target 7 on each subsequent laser pulse 6. This multiple pulse integration permits lower single laser pulse energies, since the extracted range image is the result of integration over many laser pulse returns 16 (e.g., multiple scanning periods).

To resolve spatial information from the target 7, the pulse length should have a duration that is shorter than the time it takes for the optical pulse 6 to traverse the target 7. The ability to resolve spatial information from the target 7 improves with shorter pulses. While the embodiments herein are operable with any laser providing repeatable short pulse lasers, there are particular advantages in using mode-locked lasers. For example, lasers producing nanosecond class pulses typically rely on Q-switching techniques to generate optical pulses. Q-switched lasers may be used in the lidar system embodiments herein because of their capability to generate high energy optical pulses with sufficient energy for detection after propagation to and from a distant target 7. Optical pulse lengths for Q-switch lasers typically scale with the length of the optical cavity and this typically results in nanosecond class pulse lengths (or longer).

Shorter optical pulses can be achieved by using mode-locked lasers that lock the phases of longitudinal laser cavity modes to produce optical pulses that are much shorter than the optical cavity length. Mode-locked lasers can be understood as generating a high intensity pulse that circulates in a laser cavity and releases an output pulse from the output cavity on each round-trip through the cavity. The time separating each pulse is the round-trip time of the cavity. The stability of the pulse frequency is generally very high. While the present embodiments are operable with periodically pulsed Q-switched lasers, mode-locked lasers are particularly well suited to some embodiments herein due to their short pulse length and high stability.

Mode-locked lasers may be implemented as either solid state lasers with free-space propagation or by using fiber propagation and fiber gain media. Either laser technology may be operable in one or more of the embodiments. However, for embodiments designed to interrogate targets, such as the target 7, that are more than a few meters in extent, there are certain advantages for using mode-locked lasers that utilize fiber within their cavities.

Figure 6:
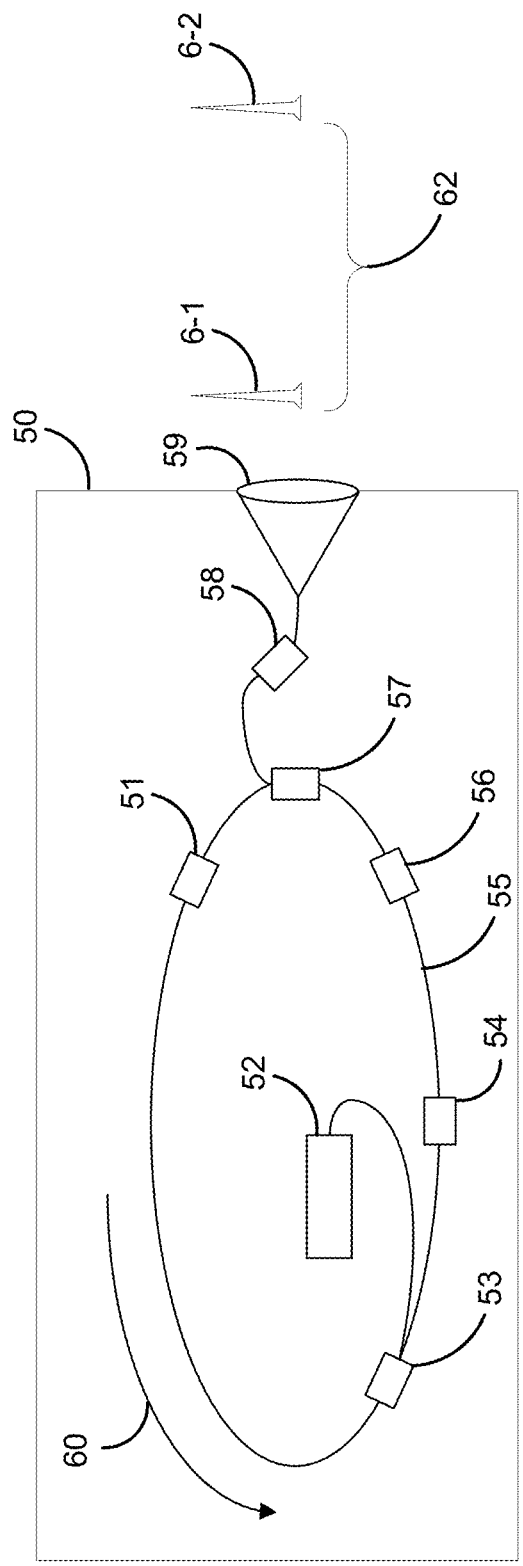
FIG. 6 illustrates an exemplary mode-locked fiber laser with a ring cavity.

FIG. 6 below illustrates an exemplary mode-locked fiber laser 50. In this embodiment, the laser cavity is a ring cavity 55 in which an optical pulse circulates in a counter-clockwise direction 60. The laser may, for example, include a saturable absorber (SA) 56, polarization control components 54, and a wave division multiplexer 53 to permit coupling of pump radiation from a pump 52 into an active fiber of the ring cavity 55. An isolator 51 may be used to suppress the buildup of optical pulses propagating in the clockwise direction. An output coupler 57 emits a portion of the circulating optical pulse on each passing via the optical element 59 (e.g., a lens and/or a dichroic mirror). For example, an optical pulse circulating through the ring cavity 55 may cause the emission of a first ultrashort laser pulse 6-1 followed by a second ultrashort laser pulse 6-2 separated in time by a pulse width 62.

In some embodiments, the photo-cathode 14 in the streak tube 11 is sensitive to radiation in the visible and ultraviolet (UV) optical bands. If the mode-locked laser emits pulses in the infrared (e.g., ~ wavelengths near 1 μm, 1.5 μm, or 2 μm), the optical pulse may be converted to visible or UV radiation through the use of a harmonic conversion component. Harmonic conversion methods and devices (e.g., second harmonic conversion (SHC) or third harmonic conversion (THC)) can be implemented with nonlinear optical crystals. In some embodiments, a Yb-doped active fiber may be used within a mode-locked laser to produce sub-ns optical pulses with wavelengths near 1 μm. In this regard, the harmonic generator 58 can be a SHC generator used to convert the 1 μm infrared pulses to green colored optical pulses. Alternatively, the harmonic generator 58 can be a THC generator used to convert 1 μm pulses to UV emissions.

A fiber mode-locked laser has the advantage that the cavity length may easily be made much longer than the physical length of the laser system, for example, using coiled fiber. Consequently, the spatial separation of successively emitted laser pulses 6 can be made many meters in length while using a relatively compact laser. It may be advantageous to have the spatial separation of successively emitted laser pulses exceed the spatial extent of an interrogated target 7 so that the received emissions 16 from subsequent laser pulses 6 do no not overlap in time. If subsequent laser pulses result in received signals that overlap in time, more complex processing may be needed to extract a range.

In some embodiments, a solid state laser may be used with a "pulse picker" that permits emission of one pulse per some preselected number of pulses, effectively emitting optical pulses at a subharmonic of the intrinsic cavity pulse rate. The pulse picker may be implemented within the optical cavity or outside of the optical cavity. In many embodiments, a laser amplifier may additionally be included after the mode-locked laser cavity to provide more energy to the generated optical pulse stream. Typically, the amplifier amplifies optical pulses 6 before any harmonic conversion.

In the case where a target 7 has a velocity component (positive or negative) with respect to the direction from the laser 8, a time delay may be continuously added to the sweep voltage circuit 12, to effectively provide Doppler correction to the laser repetition rate and permit the previously described pulse integration without smearing from target displacement on the phosphor screen 15.

Since the scan pattern generated on the phosphor is generally curvilinear, and in some embodiments, a Lissajous pattern, image processing methods may be used to extract a range image. A calibration procedure, in which a flat fiducial reflector produces a lidar return and is successively repositioned in range, may be used to map range offsets to specific pixels. For each time delay, weightings for one or more pixels for each time step in the extracted range image may be assigned to sum up a range image signal strength. For example, pixels that are near the streak tube scan path, may be give weights for calculating a signal associated with a specific position on the scan path. This procedure is used to reduce aliasing effects in the calculated measured range image.

Figure 7:
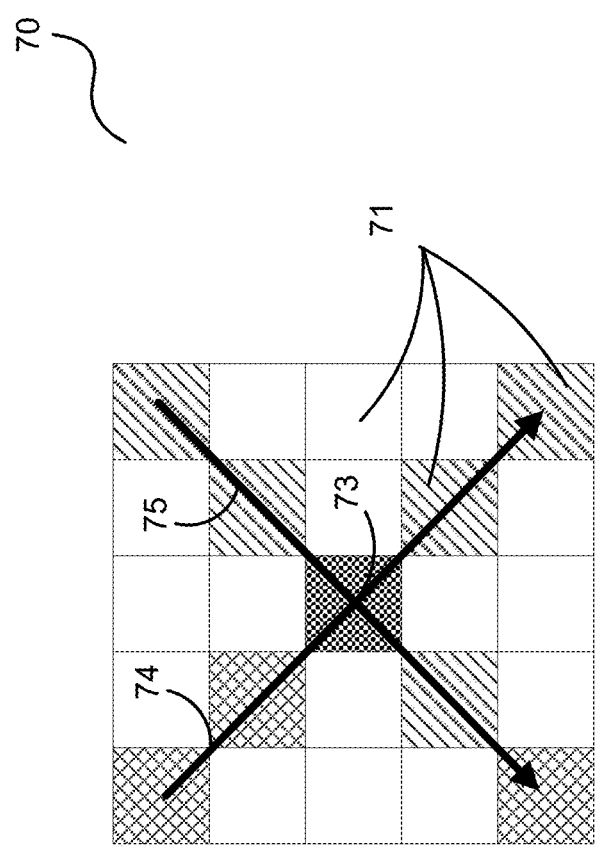
FIG. 7 shows an exemplary crossing deconfliction.

For Lissajous sweep patterns, the sweep pattern may overlap itself, as illustrated in the Lissajous sweep pattern 70 of FIG. 7. At pixels 71 that are near a crossing 73 in the sweep pattern 70, a pixel's signal level may have contributions from an optical return signal level at two non-contiguous segments of time, the "early path" 74 and the "late path" 75. Consequently, there may be some ambiguity in assigning range image values to those two non-contiguous time segments. In other words, pulses received at different times may combine intensities on the phosphor screen 15 at the crossing of sweep paths 74 and 75.

A two-dimensional hypothesis set may define the possible signals for the two crossing paths 74 and 75 at the intersection point 73, with the constraint that a weighted sum of the signals (from the two non-contiguous time segments) should be consistent with the measured pixel intensities near the crossing. Each hypothetical pair of signal strengths may be assigned a probability based on interpolations from the pixel signal values away from crossing 73 on the two sweep legs 74 and 75. The pair of range image signals values having the highest likelihood, based on the probability assignments for the two intersecting legs 74 and 75 may be selected when determining the measured range image.

Alternatively or additionally, a time delay may be simultaneously added to both the vertical and horizontal sweep waveforms (e.g., relative to the laser pulse triggers). A time delay added to both waveforms does not change the sweep pattern, but it may displace the range image data along a curvilinear sweep path. The displaced range image data results in the spatial pattern crossing 73 corresponding to an ambiguity in the range image at a different pair of non-contiguous time segments. The range image at the non-contiguous time segments corresponding to the spatial crossing 73 no longer correspond to the spatial crossing after a time delay is added, removing the need for resolving the ambiguity. In other words, by occasionally dithering the time delay between the sweep waveform(s) of the streak tube 11 and the laser pulse triggers (e.g., from the laser 8 to the sweep voltage circuit 12), this "phase dither crossing deconfliction" method may resolve the ambiguity.

In some embodiments, a time delay for the vertical and horizontal sweep waveforms may be selected to shift the range image waveform within a Lissajous sweep pattern 70 such that the signal level is low or negligible at any pattern crossings. A time delay may also be chosen such that the speed of the sweep provides a desired range resolution during portions of the range image having higher bandwidth spatial information.

In the case where the angle of target illumination undergoes rotation (e.g., due to movement of the interrogating laser 8 and/or angular motion of the target 7), a sequence of high resolution range images may be collected and accumulated over time. Using analysis and algorithms developed for computed tomography (CT) applications and for inverse synthetic aperture imaging, a series of range images may be used to construct a 2D image, or even a 3D image, of the target 7. More generally, however, range image sequences may be used to generate target "fingerprints" for identification of targets without the need for generating actual images of the target 7.

Synthetic aperture imaging was first developed with radar systems (known as "SAR") to produce high-resolution radar reflectivity maps constructed from data accumulated from a moving platform. The approach takes advantage of high-resolution range data observed from multiple vantage points to reconstruct a high-resolution image, even when transverse imaging resolution, limited by diffraction, is relatively low. While there are many technical approaches for synthetic aperture imaging, many rely on high-resolution range imaging and tomographical reconstruction.

Figure 8:
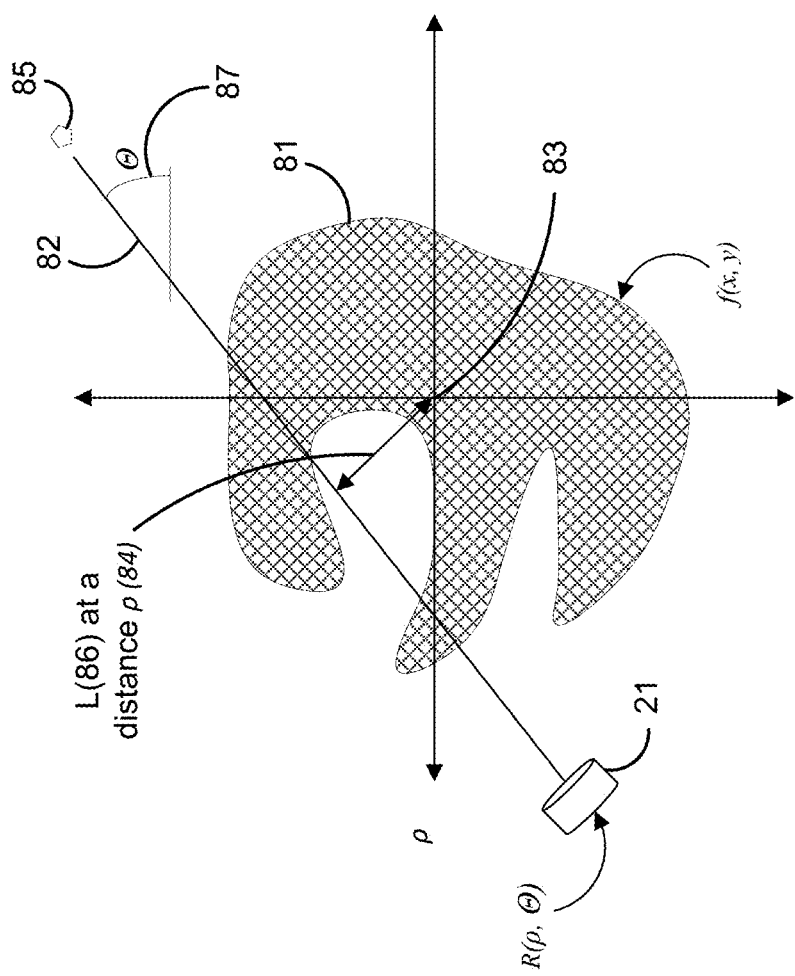
FIG. 8 shows an exemplary X-ray computed tomography geometry.

Tomographical reconstructions work because a sensor is collecting an approximation to a Radon transform (e.g., the mathematical model of a CT scan). FIG. 8 illustrates one such X-ray CT geometry. For example, imagine a single, relatively thin X-ray beam 82 passing through some two-dimensional distribution of matter 81, f(x,y) from an X-ray source 85. Assume that the beam is oriented at angle θ (87) with respect to the x-axis and is distance ρ from the origin 83. The line L (86) that defines the X-ray beam 82 in the (x,y) plane has a distance ρ (84) from the origin 83. The line L (86) that defines the X-ray beam 82 in the (x,y) plane is $L=x \cos(\theta)+y \sin(\theta)=\rho$. The detector 21 will see the integrated density distribution of matter along this line L (86). In other words, the detector 21 sees $$R(\rho, \theta) = \int_L f(x, y)ds = \int_{-\infty}^{\infty} f(x, y)\delta(x\cos\theta + y\sin\theta - \rho)dxdy,$$

where $\delta(t)$ is a Dirac delta function, $R(\rho,\theta)$ is called the Radon Transform of $f(x,y)$.

Here, it can be shown that the one-dimensional Fourier Transform of $R(\rho,\theta)$ with respect to $\rho$ is equal to the two-dimensional Fourier Transform of $f(x,y)$. This is known as the Central Slice Theorem and is part of CT-Scans as well as synthetic aperture imaging.

The Central Slice Theorem is demonstrated by taking Fourier Transform of $R(\rho,\theta)$ with respect to $\rho$ and recognizing the results as the Fourier transform of $f(x,y)$ evaluated at ($\omega \cos \theta$; $\omega \sin \theta$) as follows:

$\hat{R}(\omega;\theta) = \int R(\rho,\theta)e^{-\pi i \rho \omega}d\rho =$
$\iint f(x,y)e^{-2\pi i x \cos\theta \omega}e^{-2\pi i y \sin\theta \omega}dxdy$ As $\omega$ varies, a line with angle $\theta$ (87) to the u-axis in the (u,v) plane is tracked out. And, a slice of the Fourier transform through the center of the (u,v) plane is produced.

While a CT scanner measures a Radon transform with transmitted "pencil beams", the geometry for SAR or synthetic aperture ladar (SAL) systems is different since the interrogating radiation is larger than the measured features. For SAR and SAL, the measured spatial resolution of the measurement in $\rho$ is from time-of-flight backscattered light propagating along the $\hat{\rho}$-direction instead of relative to the laser 8 and source translation in the $\rho$ direction.

Figure 9:
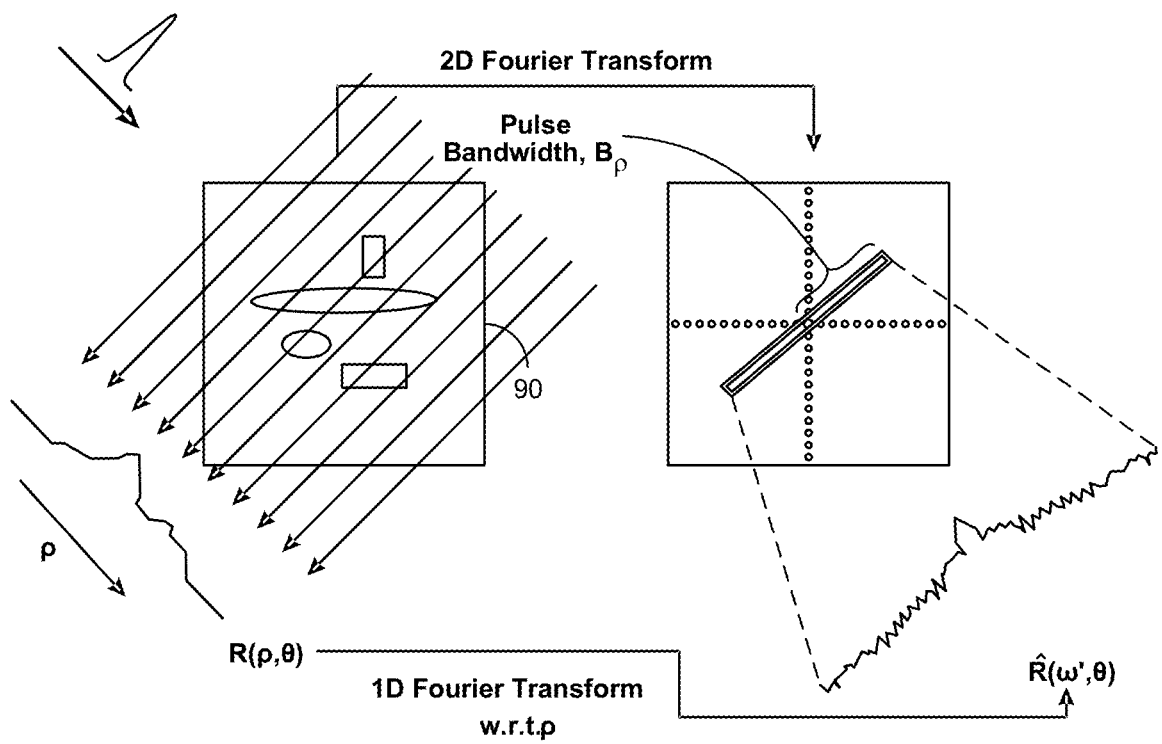
FIG. 9 illustrates an exemplary direction of the propagating radiation and an accumulated Radon transform for a specific angle associated with the direction of the signal and a computed target image calculated through an inverse Radon transform.

FIG. 9 illustrates the direction of the propagating radiation and an accumulated Radon transform for a specific angle associated with the direction of the signal. The one-dimensional Fourier transform of the range waveforms accumulated by a Radar or lidar system assembled over all interrogation angles of a scene 90 is approximately equal to the 2D Fourier transform of the scene. In practice, synthetic aperture imaging systems (e.g., SAR and SAL) make measurements over limited angular extents, and the obscurations from multiple features within the scene 90 limit Radon function measurements.

Figure 10:
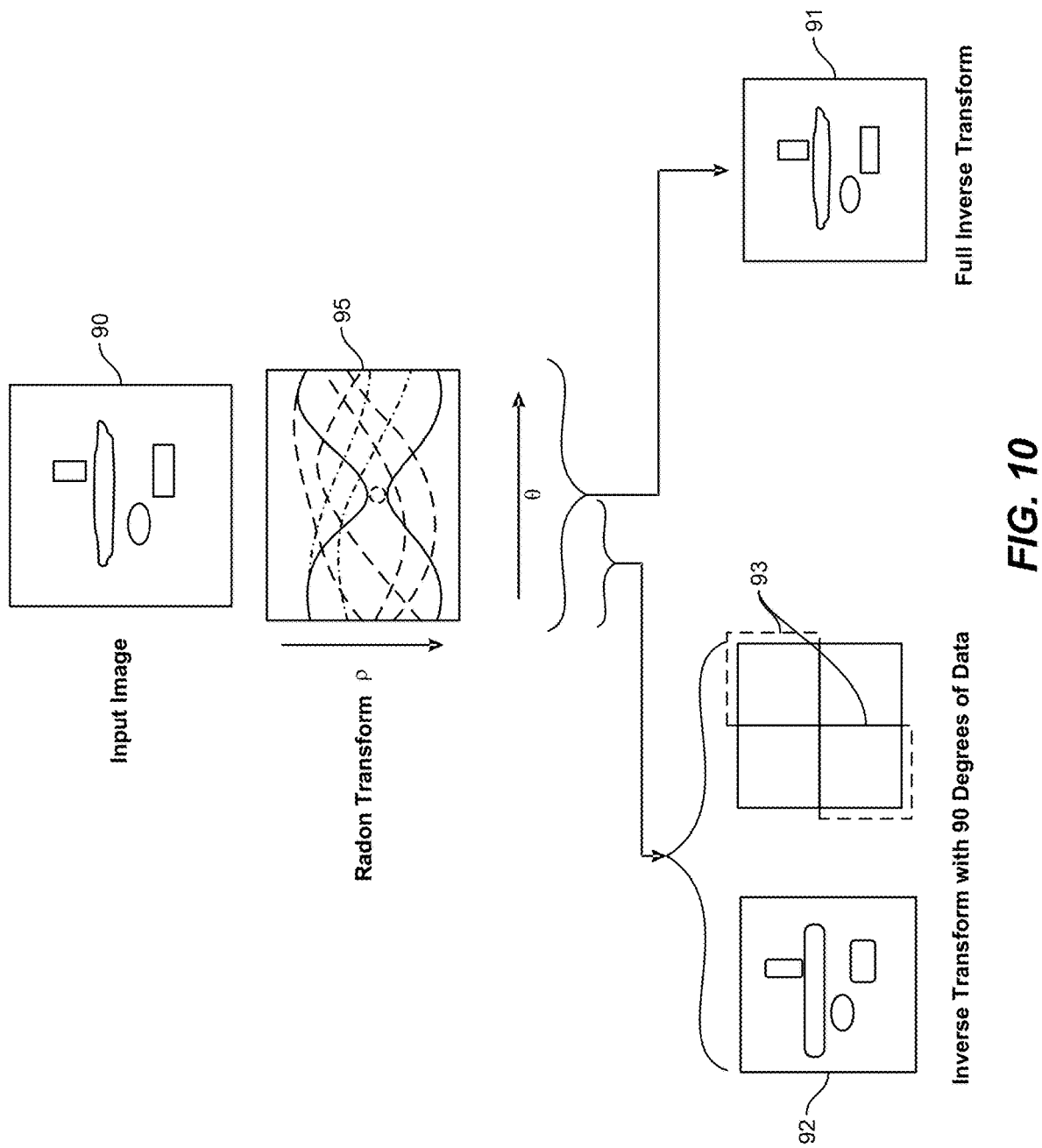
FIG. 10 demonstrates the effect of measurements over a limited angular extent.

FIG. 10 demonstrates the effect of measurements over a limited angular extent. The scene 90 is depicted at the top of FIG. 10. The Radon transform 95 is collected at one degree increments. Two images 91 and 93 are reconstructed (e.g., using filtered back-projection). The right image 91 has all of the angles and the left image 92 has only half. The boxes 93 in the lower left-hand spectrum show the spatial frequencies that are used in the partial (e.g., 90°) reconstruction. The non-zero spatial frequencies outside of the boxes 93 occur because of frequencies "spraying" into those areas due to interpolation done by the inverse processing.

Using the central slice theorem and given the measured lidar range image over aspect, $R(\rho,\theta)$, a method to reconstruct the image, $f(x,y)$ is presented. Conceptually, one would populate the (u,v) plane by computing $\hat{R}(\omega;\theta)$ for all $\theta$s and then take an inverse 2D Fourier transform. However, this approach has interpolation issues and it is not how the Radon transform is typically inverted in practice. The technique most commonly discussed in introductory approaches is called "filtered back-projection".

Regardless of the reconstruction algorithm, the resolution of the target image is dependent on the volume of data in the spatial spectrum domain. For the 2D examples, the volume of spectral content is proportional to the angular extent of the measurement, but with a quadratic dependence on the spectral content in the range measurement. It follows that, by having finer range resolution, objects can be tomographically reconstructed with less angular diversity in the measurements.

Tomographical reconstruction of the target 7 may be performed to produce either a 2D representative cross-section or with greater angle diversity about two angular axes. While in some embodiments, the representation may be suitable for human recognition of the target 7, in other embodiments, data signatures of the target 7 may act as a suitable fingerprint for automated target identification without requiring a full calculation of a 2D or 3D structure. Moreover, the collected data contains spatial information content about physical structures of the target 7 that can be analyzed and compared to known target structures and to permit target identification and to detect target changes.

For example, a particular object may have certain signatures. Thus, when the processor 26 determines that certain metrics of the object have been met, the processor 26 may identify the object without having to completely construct an image of the object itself. This may reduce the amount of processing required to correctly identify the target such that processing capabilities can be used elsewhere (e.g., for identifying other targets in the scene 90).

Coherent sensing approaches can provide wavelength range resolutions permitting target reconstructions with measurements over small angular changes, but at a price as they have challenging sensing and processing requirements. Conventional direct detection methods have much simpler implementations and processing requirements more suitable for dynamic target scenarios, but require substantial variations in target look angles to construct a target image. The present embodiments permit much finer range resolutions with direct detection and more efficient/simpler laser architectures which lead to target reconstruction with less angular extent in measurements from a platform with lower Size, Weight, and Power (SWaP).

Figure 11:
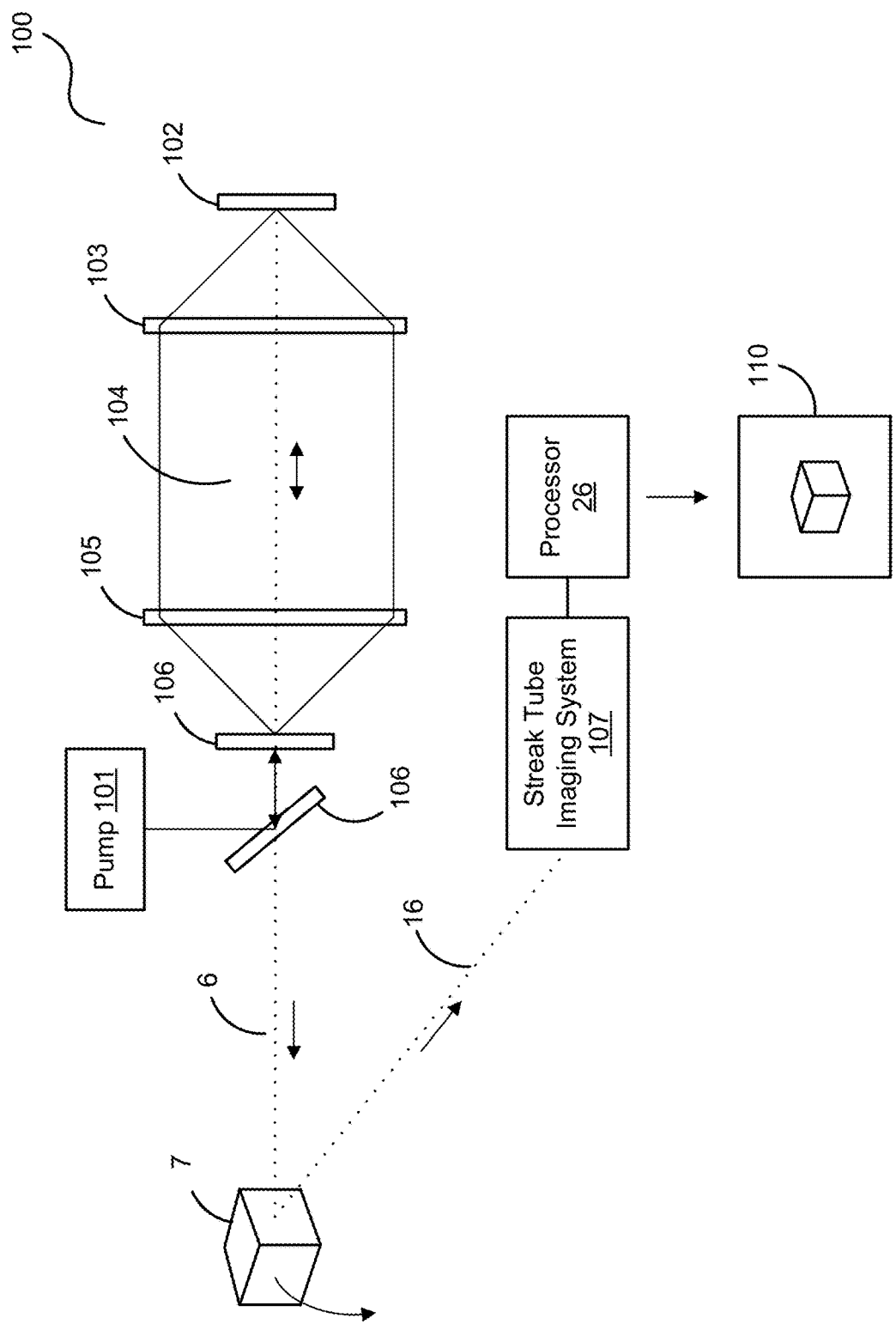
FIG. 11 is a block diagram of another exemplary lidar system.
Figure 12:
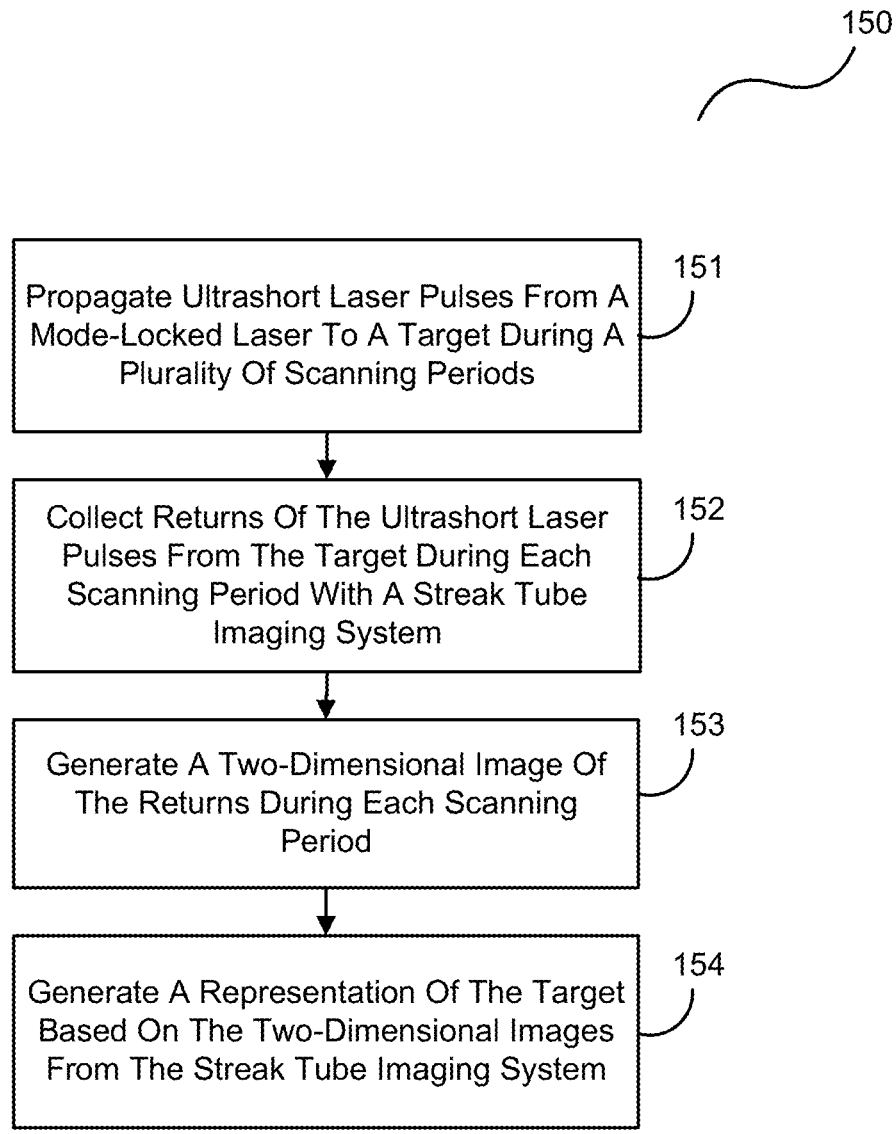
FIG. 12 is a flowchart of an exemplary process of the lidar system.

FIG. 11 is a block diagram of another exemplary lidar system 100 operable to implement one exemplary process pertaining to lidar interrogation (e.g., as illustrated in FIG. 12). The lidar system 100 fires laser pulses 6 at the target 7. The lidar system 100, in this embodiment comprises a laser cavity 104. Optical pulses are generated within the cavity 104, which circulates the pulses until they are emitted by an output coupler 106. The cavity 104 may include any combination of mirrors, gain mediums, polarization components, and lenses, as desired, to generate a pulse and emit it from the cavity.

For example, the output coupler mirror 106 may be a dichroic mirror that allows the pump laser 101 to pump the laser cavity 104 at one wavelength and allow the laser pulse 6 to exit the laser cavity 104 at a different wavelength. In this regard, one or more of the optical elements 102, 103, and 105 may be operable to change the polarization of the laser pulse 6 such that it may pass through the output coupler mirror 106. Alternatively, a wave plate may also be configured within the laser cavity 104 that alters the polarization of the laser pulses 6.

Laser pulse returns 16 are received at a streak tube imaging system 107 of the lidar system 100. The streak tube imaging system 107 transforms the returns 16 into 2D images which are subsequently processed by the processor 26 to calculate range images. The processor 26 generates spatial structure information 110, such as target radon transforms, 2D images, 3D images, and/or other identifying traits of the target 7.

In one embodiment, the pump laser 101 is operable to pump the laser light into the laser cavity 104. The laser cavity 104, in this embodiment, provides mode locking for the laser energy so as to generate ultrashort laser pulses 6 at high PRFs. As used herein, an ultrashort laser pulse generally refers to any laser pulse duration that is less than one nanosecond. The laser cavity 104 includes, for example, a mode-lock element (e.g., optical element 103, a saturable absorber), a gain medium 105, and an output coupler mirror 106. Certain exemplary embodiments provide for pulse durations in the nanosecond range (or shorter, such as picosecond range) with PRFs of about 50 MHz or higher. For example, the PRF may be configured at a rate that permits many laser pulses to be in the air, between the lidar system and the target, all at the same time.

Generally, the reciprocal of the PRF (i.e., the pulse separation period) is configured to be at least greater than two times the range extent of the target 7 divided by the speed of light $$\text{(e.g., } \frac{1}{PRF} > \frac{2\Delta r_{targ}}{c},$$

where $\Delta r_{targ}$ is the length of the illuminated target and c is the speed of light). In some cases, a higher PRF can be selected, but this may result in the range image wrapping around the sweep cycle (e.g., scanning period) of the streak tube 11, and additional algorithms may be needed to extract the target information, as described above in FIG. 7.

The streak tube imaging system 107 comprises a streak tube, such as streak tube 11 of FIG. 1, that measures light intensity variations of laser pulses over time. That is, the streak tube imaging system 107 measures the temporal evolution of optical power, or intensity, of laser pulse returns 16. In this embodiment, the streak tube imaging system 107 is operable to perform that functionality on the laser pulse returns 16 from the target 7. In this regard, the streak tube imaging system 107 may be "triggered" with the firing of the laser pulses 6 so as to ensure that the periodic laser pulse returns 16 are properly recorded. The streak tube imaging system 107 operates by transforming the intensity variations of a laser pulse return 16 into a spatial profile on a detector (e.g., a charge coupled device camera, or "CCD camera") and causing a time-varying deflection of the light within the detector, called the "streak image".

Streak tubes in general employ an elongated horizontal slit. However, in some embodiments, the aperture may not be elongated (e.g., having similar horizontal and vertical extent) where the laser pulse returns 16 enter, as illustrated in FIG. 1. This may provide the lidar system 100 with improved range image resolution during horizontal sweeps while also reducing background optical collection.

Photons reaching a photo-cathode of the streak tube imaging system 107 are converted to electrons via the photoelectric effect. These electrons are accelerated longitudinally within the streak tube imaging system 107 by a bias grid. At the end of this longitudinal acceleration, the electrons are focused by an electrostatic lens. Electrons are also deflected laterally by a time-varying transverse electric field. This field is created by placing electrical potentials across one or two pairs of plates (each pair having one plate on each side of the electron stream). This effectively paints the electron stream onto a phosphor screen of the streak tube imaging system 107 in a sweeping motion (similar to a cathode-ray tube television). The phosphorescence from the phosphor screen (i.e., the streak image) is then recorded by the detector.

The streak tube imaging system 107 may be mechanical, optoelectronic, or a combination thereof. Mechanical streak cameras are somewhat limited due to the speeds at which their rotating mirrors operate. Thus, optoelectronic streak tube imaging systems may be used for faster PRF systems with shorter pulse durations. Optoelectronic streak tube imaging systems operate by directing laser pulse light onto a photo-cathode, which when hit by photons produces electrons via the photoelectric effect. The electrons are accelerated in a cathode ray tube (a.k.a. a streak tube) and pass through an electric field produced by one or two pairs of plates. For example, a first set of plates may deflect the electrons in a perpendicular manner and in some systems a second set of plates may deflect electrons in a horizontal direction. By modulating the electric potential between the plates, the electric field is quickly changed to give a time-varying deflection of the electrons and sweeping the electrons across the phosphor screen at the end of the cathode ray tube. In some embodiments, an optoelectronic streak tube imaging system can achieve temporal resolutions on the order of 100 femtoseconds or less.

The implementation of the streak tube imaging system 107 in the lidar system 100 may be made as a matter of design choice. However, as relatively high resolution of the imaging of the target 7 may be necessary (e.g., in relatively long range target environments), certain embodiments of the lidar system 100 may favor the use of ultrashort laser pulses with relatively high PRFs.

The processor 26 is any device, system, software, or combination thereof operable to generate a representation (e.g., a 2D image, a 3D image, and/or other forms of identification) of the target 7 from the 2D images of the laser pulse returns 16 produced by the streak tube imaging system 107. One example of a computing system operable as the processor 26 is shown and described below in FIG. 21.

FIG. 12 is a flowchart illustrating an exemplary process 150 of the lidar system 100 of FIG. 11. In this embodiment, the lidar system 100 fires ultrashort laser pulses from a laser (e.g., a mode-locked laser), in the process element 151. As mentioned, the lidar system 100 may be configured as a high resolution lidar system. Part of the reason for this regards the range to the target 7 and the angular diversity of the target 7 with respect to the lidar system 100. For example, the lidar system 100 may be capable of imaging objects over great distances (e.g., over a kilometer, 100 km, or even 1 Mm). And, a large number of pulses/returns may be necessary to produce such images.

Additionally, a large number of pulses at a relatively high PRF (e.g., 80 MHz or higher) allows the lidar system 100 to sample different portions of the target 7 due to the angular diversity between the target 7 and the lidar system 100. As illustrated in the process element 151, the lidar system 100 fires the ultrashort laser pulses 6 at the target 7 during a plurality of scanning periods. For example, the streak tube imaging system 107 is operable to provide a 2D image of intensity variations of a laser pulse return 16 over time by transforming the intensity variations of the laser pulse return 16 into a spatial profile. Instead of observing the intensity variation of a single laser pulse return 16 over time, the phosphor screen of the streak tube imaging system 107 can be used to accumulate intensity variations of multiple laser pulse returns 16 over time, essentially integrating the intensity variations of a plurality of laser pulse returns 16. The lidar system 100 takes advantage of this phosphorescence of the streak tube imaging system 107 to generate a scanning period from each of a multiple laser pulse returns 16.

In this regard, the streak tube imaging system 107 collects returns 16 of the ultrashort laser pulses 6 from the target 7 during each scanning period, in the process element 152. And, during each scanning period, the streak tube imaging system 107 generates a 2D image of the ultrashort laser pulse returns 16 from the target 7, in the process element 153. The processor 26 then processes the 2D images generated by the streak tube imaging system 107 to generate spatial structure information 110 of the target 7, in the process element 154. For example, the processor 26 may generate a representation of the target 7, such as a 2D image, a 3D image, or some other signature of the target 7, that may be used to identify the target 7.

It should be noted that in the embodiments shown and described herein, the target 7 may be moving with respect to the lidar system 100. However, the lidar system 100 may be alternatively or additionally moving with respect to the target 7 so as to produce the desired angular diversity between the lidar system 100 and the target 7.

Figure 13:
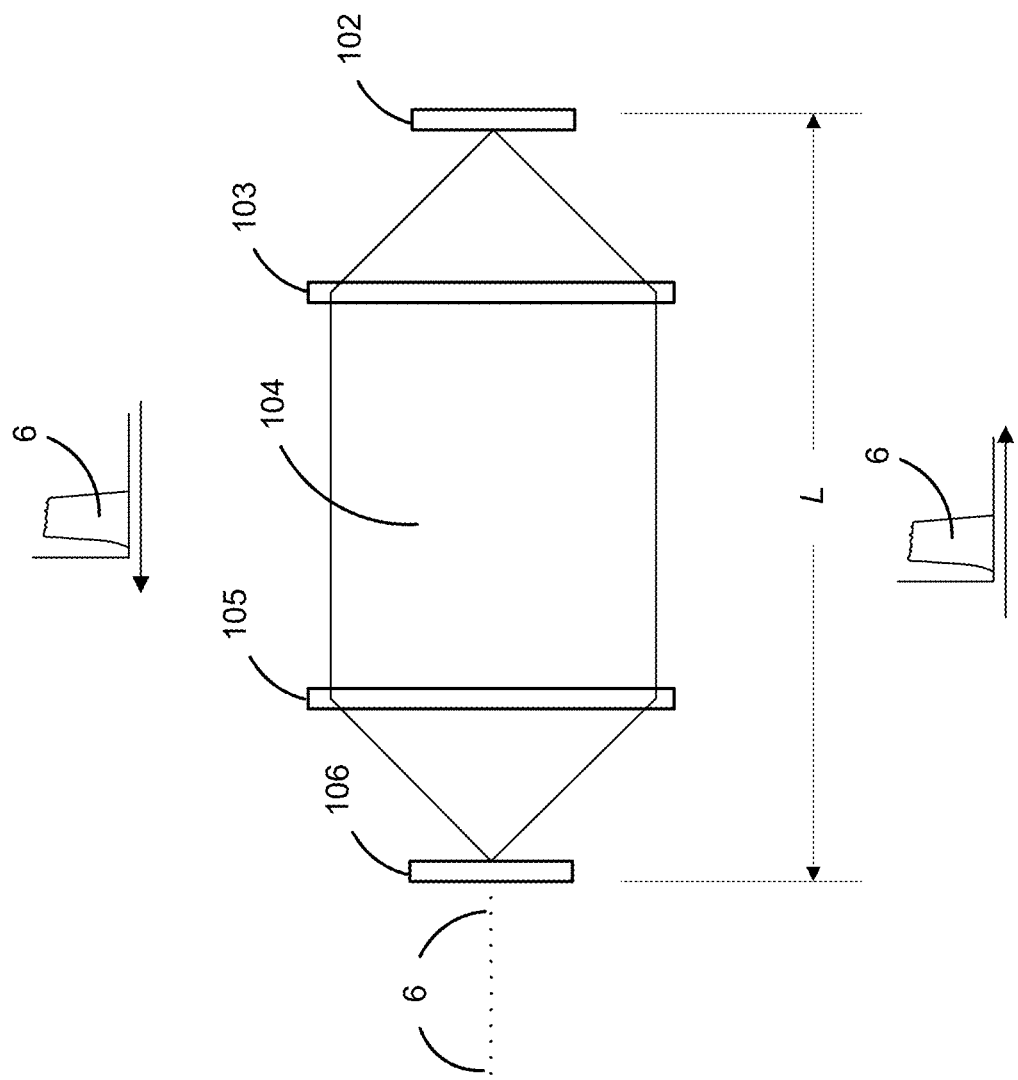
FIG. 13 is an exemplary block diagram of a mode-locked laser cavity.

FIG. 13 is an exemplary block diagram of a mode-locked laser cavity 104. Again, the laser cavity 104 includes, for example, a mode-lock element 103 (e.g., a saturable absorber), a gain medium 105, and an output coupler mirror 106. Generally, the laser cavity 104 is operable to output the laser pulses 6. The laser cavity 104 has a length L that may be determined as a matter of design choice. For example, a laser pulse 6 exits the laser cavity 104 at the output coupler mirror 106. The laser pulse 6 is emitted from the laser cavity 104 when a laser pulse within the cavity is incident on the output coupler mirror 106. Thus, the time between laser pulses is the time it takes for internal pulses to circulate the laser cavity 104. For linear cavities this time is 2 L/c, where c is the speed of light ($\sim 3 \times 10^8$ m/s). So, if one desired to have a PRF of 80 MHz, the laser cavity 104 may be configured to be about 1.875 meters in optical path length for a linear cavity, or 3.75 m for a ring cavity.

Figure 14:
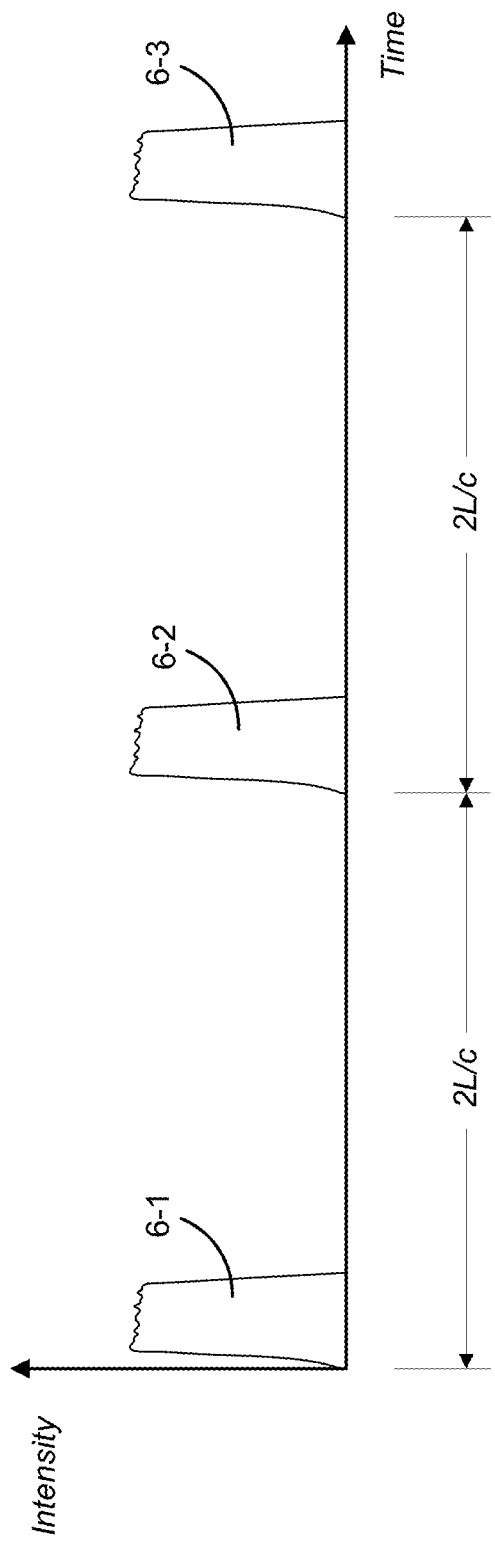
FIG. 14 is an exemplary series of pulses from a mode-locked laser cavity.

FIG. 14 illustrates an exemplary series of pulses 6-1-6-3 from the mode-locked laser cavity 104 of FIG. 13. The pulses 6-1-6-3 have a pulse separation of 2 L/c (note that for a ring cavity the pulse separation may be L/c). In embodiments that utilize a mode-locked fiber laser, the cavity length may be much longer than the physical length of the laser cavity and this can allow the lidar system to unambiguously image targets that are much larger than the size of the laser itself. Alternatively, by selective pulse picking, the time period between pulses can be chosen to enable detection of longer targets without incurring range image wrapping around the sampling period.

Again, the embodiments herein are not intended to be limited to any particular laser cavity length or PRF as such may be configured as a matter of design choice. In fact, a cavity end mirror (e.g., the optical element 102) may also be configured with an actuator that changes the length of the laser cavity 104 as desired. For example, detection of laser pulses in the picosecond or even femtosecond range at relatively high PRFs is a challenging proposition. The streak tube imaging system 107 advantageously provides the ability to image temporal profiles of ultrashort laser pulses at high PRFs. But, the PRF may also be modulated by the actuator over a scanning period so as to compensate for Doppler shifts in the received signal. For a fast rotating target, Doppler shifts of signals emanating from different portions of the target may result in a range image "smearing-defocus" in an integrated image. A modulated PRF may be used to provide sequential compensation to different portions of the range image.

The frequency difference between the PRF of the voltage waveforms provided to the streak tube imaging system 107 and the PRF of laser cavity may be iteratively modified to improve Doppler compensation. A measurement metric indicative of relatively good Doppler correction can be used to determine whether the difference frequency should be increased or reduced. An exemplary metric is the range image signal strength within a specified frequency band. When Doppler difference frequencies are incorrect, the collected range images may include a "smear defocus" that reduces the high frequency spectral content. Incremental frequency corrections to increase the higher spectral frequency components of the measured range image may be used to improve Doppler corrections.

Figure 15:
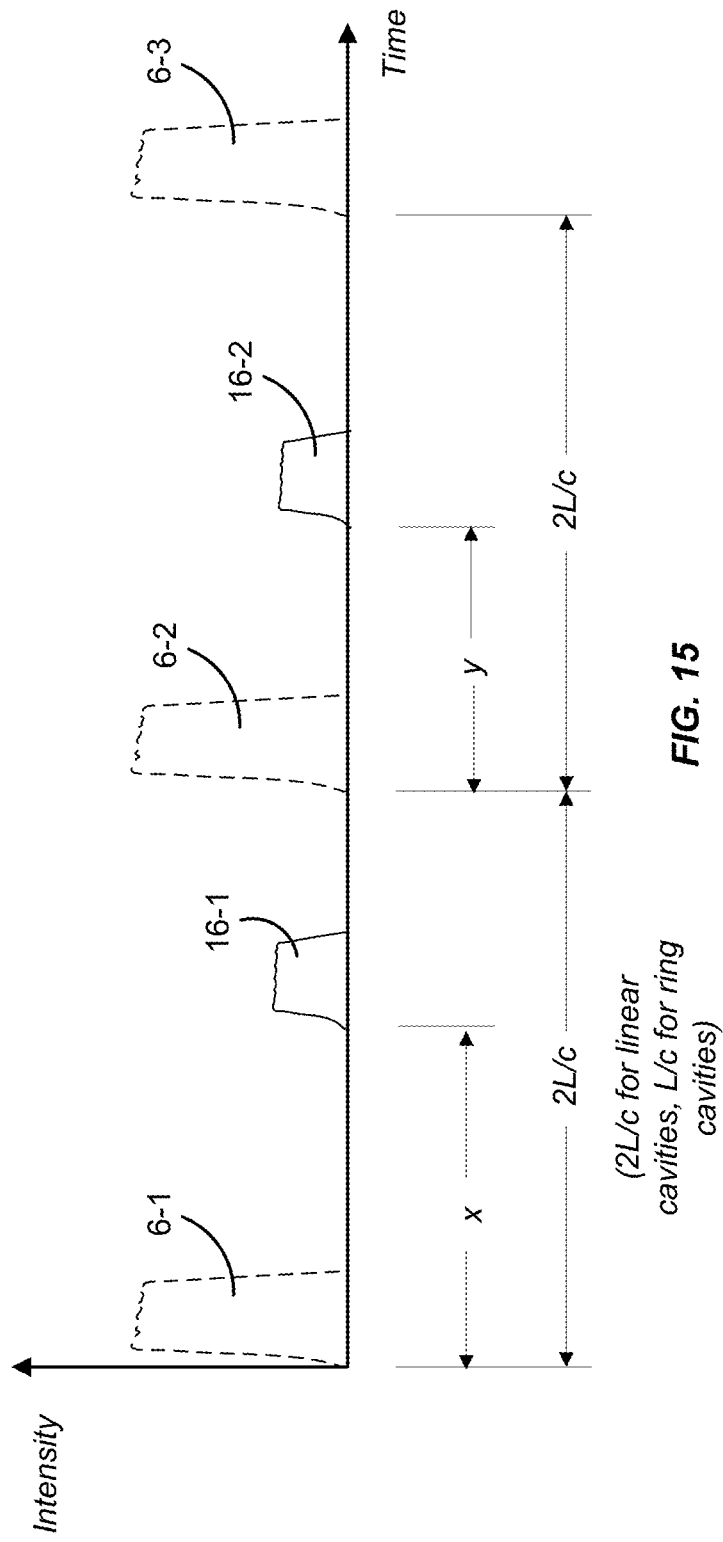
FIG. 15 exemplarily illustrates laser pulses and their returns.

FIG. 15 exemplarily illustrates laser pulses 6-1-6-3 and their corresponding returns 16-1-16-2 (with laser pulse return 16-3 not being shown for the sake of simplicity) from an approaching target 7. The laser pulse returns 16 may have a temporal phase mismatch with respect to their corresponding laser pulses 6. As can be seen from the graph (exaggerated for the purposes of illustration), the laser pulse return 16-1 has a larger delay x from its corresponding laser pulse 6-1 than does the laser pulse return 16-2 from its corresponding laser pulse 6-2 (i.e., delay y). This indicates that the sampling time between the received return signals 16-1 and 16-2 is less than the time between the transmitted laser pulses 6-1 and 6-2. Thus, it can be concluded that the moving target has changed position. However, since the PRF of the lidar system 100 is relatively high, in some scenarios, it may be determined that the actual change of position is somewhat negligible and that the change in distance may also be attributable to rotation or motion within the target 7. During multiple cycle time integration on the phosphor changes in the delay result in a "smear defocus" of the range image. The smear defocus can be reduced by implementing a corrective Doppler frequency mismatch between the laser PRF and the streak tube RF waveform frequency used to drive the electron sweeps.

Figure 16:
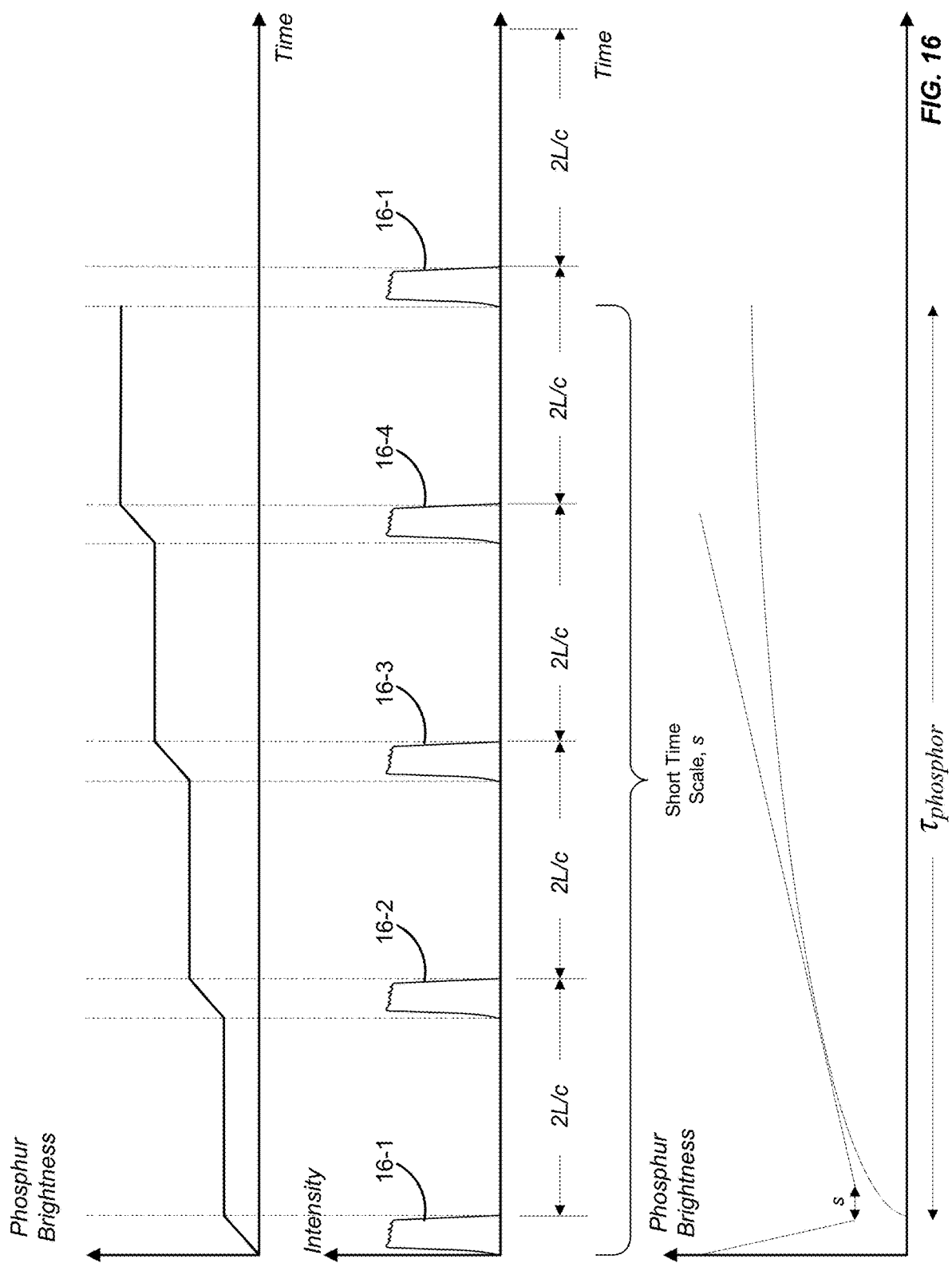
FIG. 16 exemplarily illustrates laser pulse returns and their corresponding effects on a streak tube imaging system.

FIG. 16 illustrates a series of received laser pulse returns 16 and the resulting increase in phosphor brightness in the streak tube imaging system 107. On a time scale, s, that is shorter than the phosphor emission time scale ($\tau_{phosphor}$), the phosphor brightness is increased with each subsequent optical signal iteration (e.g., from laser pulse returns 16-1-16-4), effectively integrating the return signal (e.g., at each specific phosphor spatial location). At time-scales longer than the phosphor emission time, equilibrium is achieved and the phosphor brightness is proportional to the average power absorbed from incident electrons. The phosphor acts to provide analog signal integration for each time element in a repetitively received range image. The equilibrium phosphor brightness may then be further integrated by a camera (e.g., the detector 21) which collects an image over a time that may be selected as comparable to the phosphor emission time scale.

Figure 17:
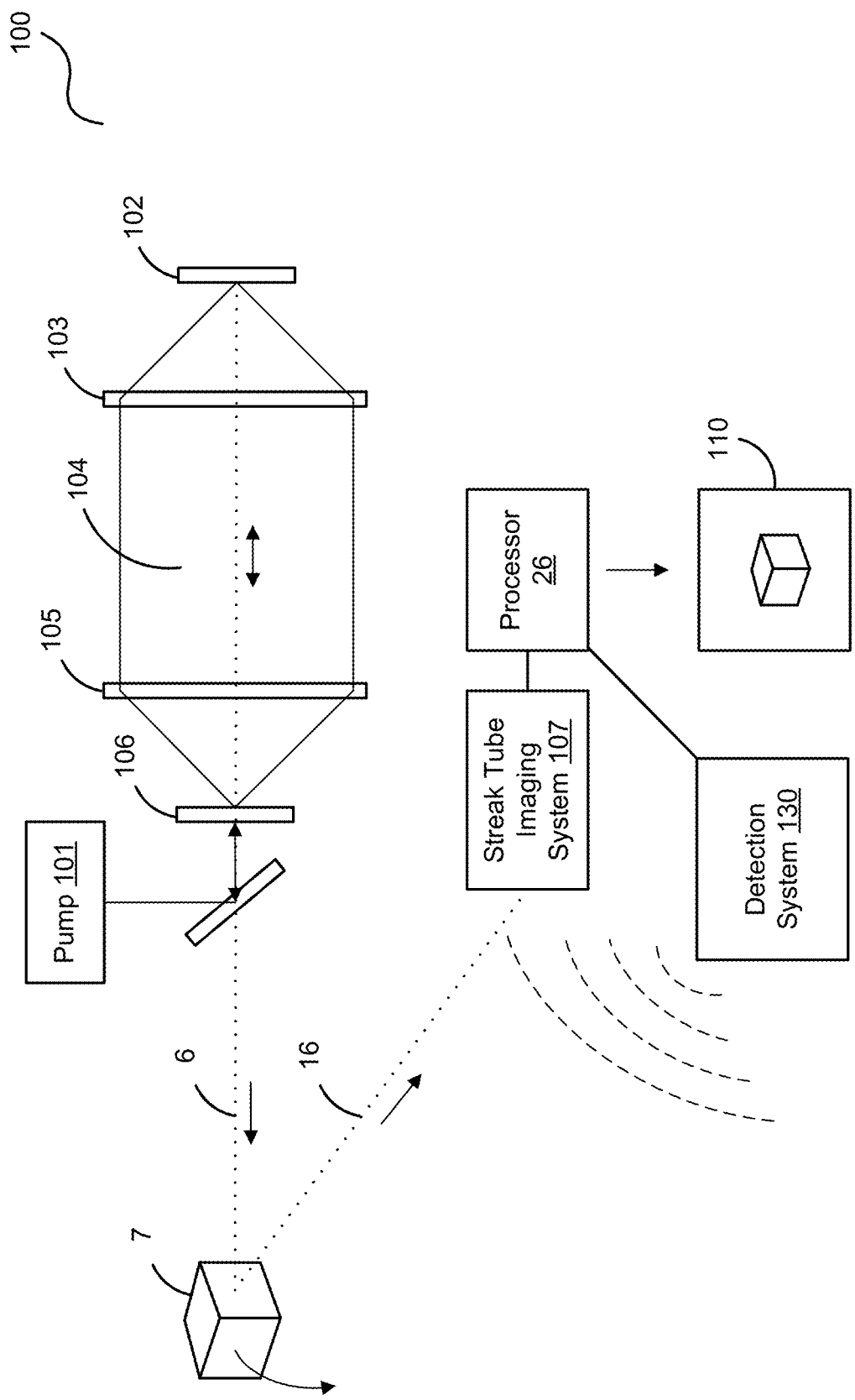
FIG. 17 is a block diagram of another exemplary lidar system employing a supplemental detection system.

FIG. 17 is a block diagram of another exemplary lidar system 100 employing a supplemental detection system 130. The detection system 130 may be used to initially detect the target 7 so as to provide guidance to the lidar system 100. For example, the lidar system 100 may be operable to image targets from greater distances. However, those distances may not be readily observable to the human eye. And, the lidar system 100 is highly directional. So, knowing where to point the lidar system 100 can be a challenge. The detection system 130 may be implemented in a variety of ways as a matter of design choice to overcome the challenge. For example, one possible detection system may be a radar system that is operable to initially detect the target 7 as it enters within range of the lidar system 100. With its location determined, the lidar system 100 could then image the target 7 as described in the embodiments above. The supplementary detection system may, for example, provide a velocity of approach that may be used to implement a laser and streak camera waveform PRF mismatch for Doppler compensation.

Figure 18:
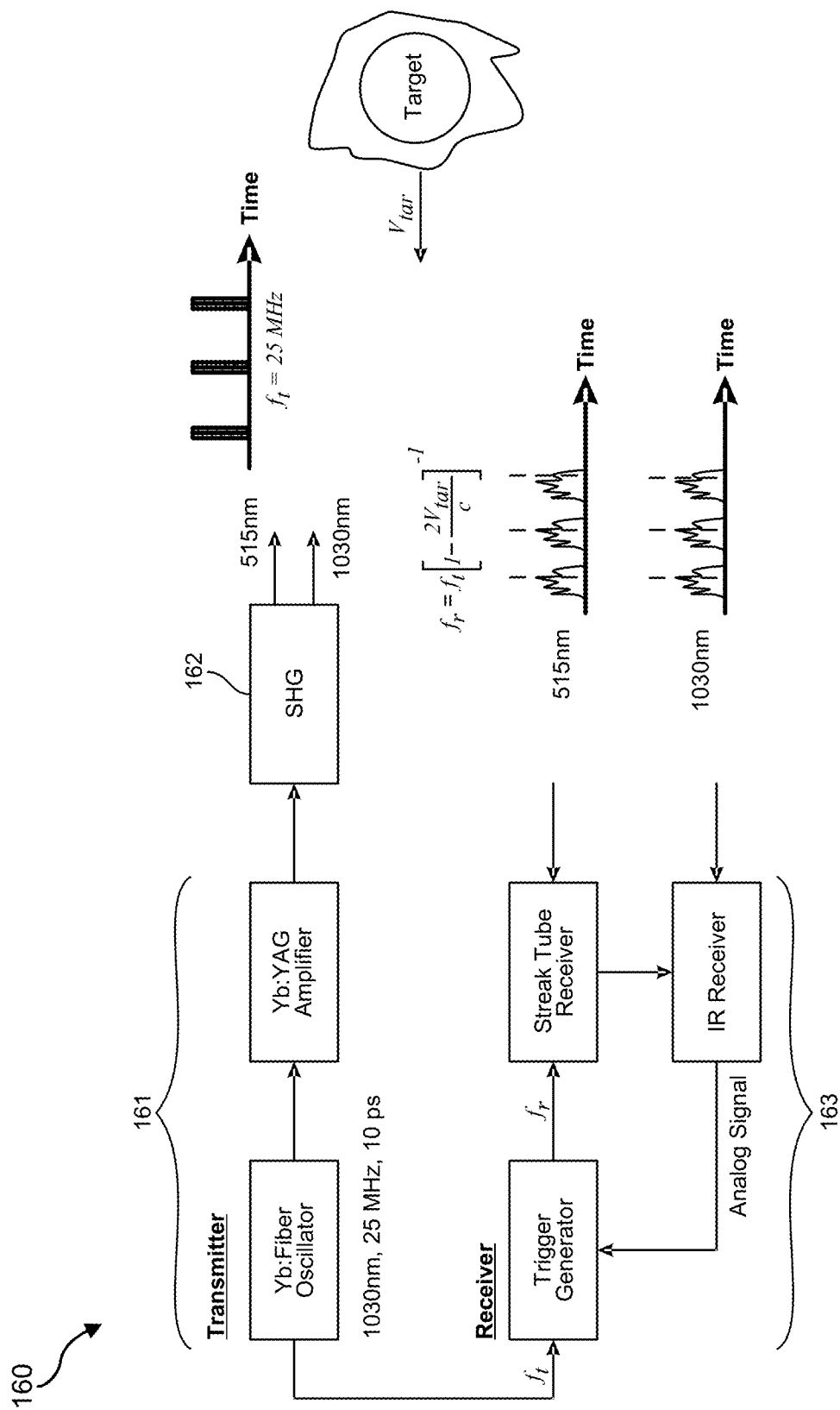
FIG. 18 is a block diagram of another exemplary lidar system in one exemplary reduction to practice.

In yet another embodiment, a lidar system 160 shown in FIG. 18 includes a laser 161 that may generate optical pulses at an infrared wavelength (e.g., 1030 nm) and utilize harmonic generation 162 to convert much of the energy in the infrared pulses into UV or visible optical pulses (e.g., 515 nm, via second harmonic generation) so that pulses at both the fundamental wavelength and the harmonic wavelength are delivered to a target, such as target 7 of FIG. 1. The detection system 163 may utilize an infrared detector for measuring infrared returns from the target and determines the Doppler shifted return frequency therefrom. Determining the Doppler shifted return frequency may include the use of a phase lock loop detection system. An electronically generated signal at the Doppler shifted return frequency may then be matched to the received infrared signal and used to control the streak tube deflector plate voltage signals.

In some embodiments, the streak tube may be sensitive enough to detect single photons. In this regard, a single image of the phosphor may have a low number of bright spots corresponding to single photon detections. To limit electrical noise, each spot within the image that exceeds a determined threshold may be identified as a single photon detection, and the position of the spot relative to the sweep path may be used to add a photon count to an accumulated digital range image. By repeating the process with multiple streak tube images, the accumulated digital range image may have sufficient signal for further processing or analysis.

Figure 19:
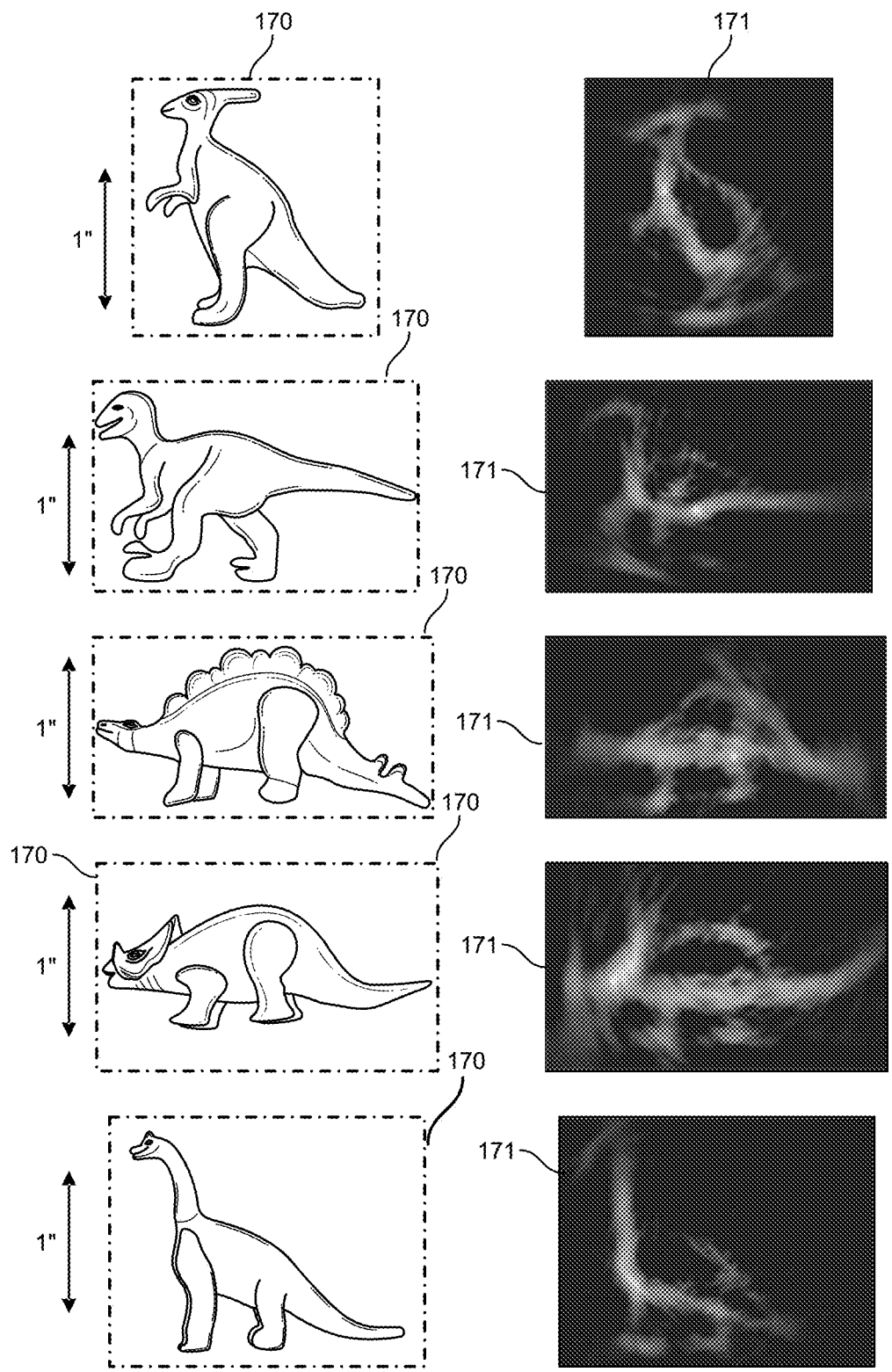
FIG. 19 shows a series of targets identified by the exemplary lidar system of FIG. 18 in one exemplary reduction to practice.

FIG. 19 shows a series of relatively small plastic dinosaurs 170 that were rotated as targets in one exemplary embodiment of the lidar system. In this exemplary experimental embodiment, the lidar system included a Ti: Sapphire mode-locked laser that emitted ultrashort pulses at a frequency of approximately 79 MHz. The optical pulses were passed through a second harmonic generation crystal to produce optical pulses with a wavelength of 400 nm which were then projected to illuminate a dinosaur target 170 while being rotated above a turntable at rotation period of about 49 seconds. A streak tube was operated with vertical and horizontal electrode voltages that were matched to the laser pulse frequency with a phase locked loop. Using 100 ms integration times on the camera, the phosphor was imaged once for approximately every 8 million optical pulses. In this mode of operation, the streak tube typically captured between several 10's of photons and a few hundred photons for each camera image. Using thresholding and blob detection, each photon detection was identified and replaced in the image plane with a single count in a pixel. This image processing based photon detection process vastly reduces system noise.

Figure 20:
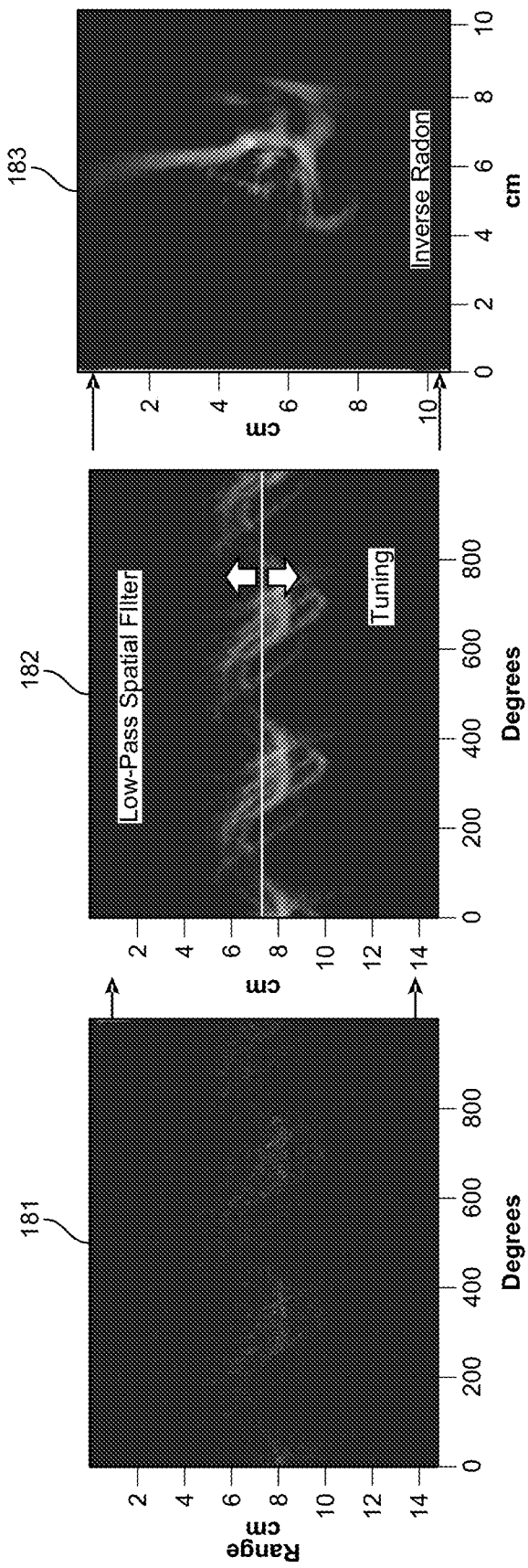
FIG. 20 shows range images that were extracted from a photon counting processed image frame that were stacked to form a sparse target Radon transform in one exemplary reduction to practice, and a computed target image produced through an inverse Radon transform.

As shown in FIG. 20, range images were extracted from each photon counting processed image frame and stacked to form a sparse target radon transform 181. Prior to calculating an inverse radon transform 183 to extract the 2D target images, a low pass spatial filter 182 was used to provide some effective signal integration over small angles and small ranges. For the inverse radon transform 183 to produce a focused 2D image, the range about which the target was rotated should be known. Series trial rotation ranges were hypothesized and tuned to provide an inverse radon transform (calculated through filtered back-projection algorithms) that had "in-focus" properties suitable for interpretation as an image. Next to the image of each plastic dinosaur 170 in FIG. 19, the resulting tomographically reconstructed target image 171 is also shown. This exemplary LIDAR embodiment illustrates the high resolution target reconstruction capability of the embodiment, even when low light returns are collected and for methods that do not require spatially resolved imaging. The exemplary embodiments herein are very suitable for high resolution imaging of targets at very long ranges.

Figure 21:
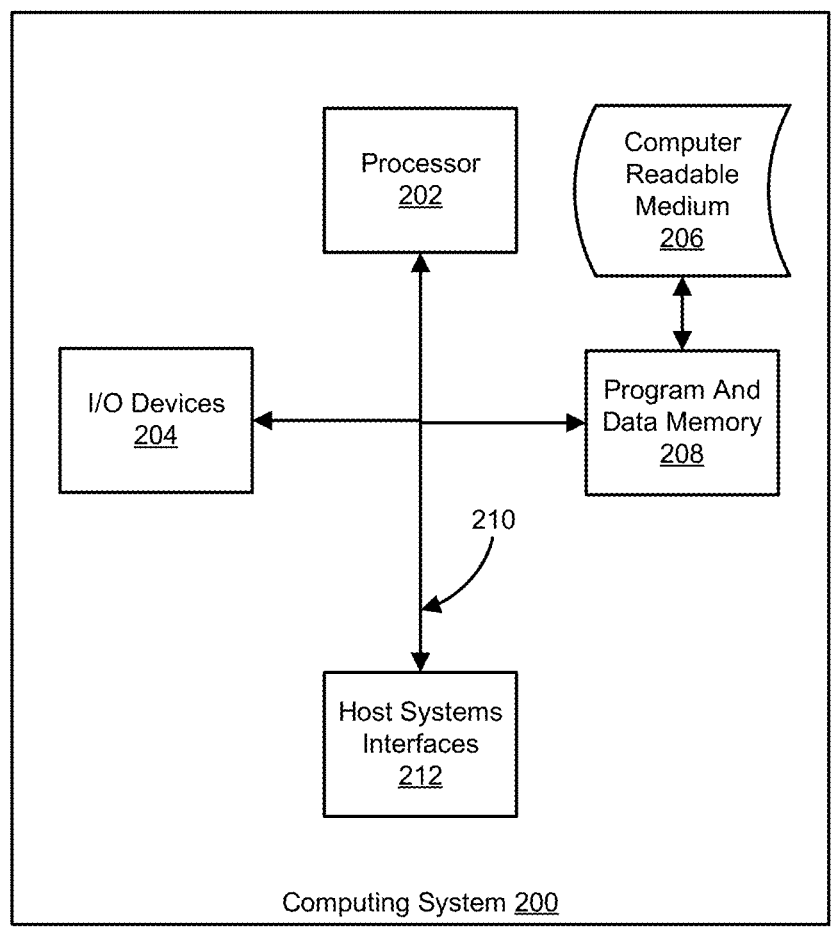
FIG. 21 is a block diagram of an exemplary computing system in which a computer readable medium provides instructions for performing methods herein.

Any of the above embodiments herein may be rearranged and/or combined as a matter of design choice. Accordingly, the embodiments are not to be limited to any particular embodiment disclosed herein. Additionally, the embodiments can also take the form of an entirely hardware embodiment or an embodiment containing both hardware and software elements. In one embodiment, portions of the embodiments are implemented in software (e.g., to be processed at least in part by the processor 26), which includes but is not limited to firmware, resident software, microcode, etc. FIG. 21 illustrates a computing system 200 in which a computer readable medium 206 may provide instructions for performing any of the methods disclosed herein.

For the purposes of this description, the computer readable medium 206 can be any apparatus that can tangibly store the program for use by or in connection with the instruction execution system, apparatus, or device, including the computer system 200. The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk, a solid state storage device (SSD), and an optical disk. Some examples of optical disks include compact disk-read only memory (CD-ROM), compact disk-read/write (CD-R/W) and digital versatile disks (DVD).

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

What is claimed is:

1. A laser ranging and detection (lidar) system, comprising:
   a laser operable to provide laser ranging and detection by propagating ultrashort laser pulses to a target during a plurality of scanning periods;

a streak tube imaging system operable to collect returns of the ultrashort laser pulses from the target during each scanning period, and to generate a two-dimensional (2D) image of the returns of the ultrashort laser pulses during each scanning period; and a processor operable to generate a representation of the target based on the 2D images from the streak tube imaging system.

2. The lidar system of claim 1, wherein:

the processor is further operable to synchronize the propagation of at least a portion of the ultrashort laser pulses from the laser with a corresponding portion of the returns of the ultrashort laser pulses at the streak tube imaging system.

3. The lidar system of claim 1, wherein:

the laser is a mode-locked laser operable to propagate the ultrashort laser pulses at a rate of at least 1 MHz.

4. The lidar system of claim 1, further comprising:

a radar system operable to detect a location of the target, and to direct the laser to the target.

5. The lidar system of claim 1, wherein:

the processor is further operable to correct a Doppler frequency mismatch between laser pulse repetition frequency and a frequency of a voltage waveform of the streak tube imaging system.

6. The lidar system of claim 1, wherein:

the laser comprises a cavity with at least one gain medium.

7. The lidar system of claim 1, wherein:

the streak tube imaging system is operable to integrate the returns of the ultrashort laser pulses over multiple scanning periods.

8. The lidar system of claim 1, wherein:

the processor is further operable to operable to perform a tomographical reconstruction of the target.

9. The lidar system of claim 1, wherein:

the streak tube imaging system comprises two electrode pairs, each electrode pair coupled to a dedicated time varying voltage waveform source, to sweep electrons resulting from the returns of the ultrashort laser pulses in a continuous pattern.

10. The lidar system of claim 1, wherein:

the processor is further operable to resolve ambiguities in crossing sweep patterns of the streak tube imaging system.

11. The lidar system of claim 1, wherein:

the processor is further operable to perform an inverse Radon transform to generate the representation of the target from the 2D images from the streak tube imaging system.

12. A laser ranging and detection (lidar) method, comprising:

providing laser ranging and detection by propagating ultrashort laser pulses from a laser to a target during each of a plurality of scanning periods;

collecting returns of the laser pulses from the target during each scanning period with a streak tube imaging system;

generating a two-dimensional (2D) image of the returns of the ultrashort laser pulses during each scanning period; and generating a representation of the target based on the 2D images.

13. The method of claim 12, further comprising:

synchronizing the propagation of at least a portion of the ultrashort laser pulses from the laser with a corresponding portion of the returns of the ultrashort laser pulses at the streak tube imaging system.

14. The method of claim 12, wherein:

the laser is a mode-locked laser; and the method further comprises propagating the ultrashort laser pulses at a rate of at least 1 MHz.

15. The method of claim 12, further comprising:

detecting a location of the target with a radar system; and directing the laser to the target based on said detecting.

16. The method of claim 12, further comprising:

correcting a Doppler frequency mismatch between laser pulse repetition frequency and a frequency of a voltage waveform of the streak tube imaging system.

17. The method of claim 12, wherein:

the laser comprises a cavity with at least one gain medium.

18. The method of claim 12, further comprising:

integrating the returns of the ultrashort laser pulses from the target over multiple scanning periods with the streak tube imaging system.

19. The method of claim 12, further comprising:

performing a tomographical reconstruction of the target.

20. The method of claim 12, further comprising:

sweeping electrons resulting from the returns of the ultrashort laser pulses in a continuous pattern via two electrode pairs of the streak tube imaging system, wherein each electrode pair is coupled to a dedicated time varying voltage waveform source.

21. The method of claim 12, further comprising:

resolving ambiguities in crossing sweep patterns of the streak tube imaging system.

22. The method of claim 12, further comprising:

performing an inverse Radon transform to generate the representation of the target from the 2D images from the streak tube imaging system.

23. A laser ranging and detection (lidar) system, comprising:

a laser operable to provide laser ranging and detection by propagating laser pulses to a target;

a streak tube imaging system operable to collect returns of the laser pulses from the target, to propagate electrons resulting from the returns to a phosphor screen using a pair of time varying waveforms, and to generate two-dimensional (2D) images of the returns based on the electrons; and a processor operable to generate a representation of the target based on the 2D images.

* * * * *